US011871477B2

(12) United States Patent
Ryu et al.

(10) Patent No.: US 11,871,477 B2
(45) Date of Patent: Jan. 9, 2024

(54) DETERMINING DISCONTINUOUS RECEPTION COMMUNICATION PARAMETERS FOR SIDELINK COMMUNICATIONS

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Fairless Hills, PA (US); Tao Luo, San Diego, CA (US); Wooseok Nam, San Diego, CA (US); Peter Gaal, San Diego, CA (US); Juan Montojo, San Diego, CA (US); Xiaoxia Zhang, San Diego, CA (US); Jing Sun, San Diego, CA (US); Hua Wang, Basking Ridge, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 17/303,575

(22) Filed: Jun. 2, 2021

(65) Prior Publication Data

US 2022/0394808 A1 Dec. 8, 2022

(51) Int. Cl.
*H04W 76/28* (2018.01)
*H04W 72/04* (2023.01)
(Continued)

(52) U.S. Cl.
CPC ........... *H04W 76/28* (2018.02); *H04W 24/08* (2013.01); *H04W 72/0453* (2013.01); *H04W 92/18* (2013.01)

(58) Field of Classification Search
CPC . H04W 24/08; H04W 76/14; H04W 72/0453; H04W 76/28; H04W 92/18
See application file for complete search history.

(56) References Cited

U.S. PATENT DOCUMENTS

| 2021/0029768 | A1* | 1/2021 | Shih ...................... H04W 76/18 |
| 2021/0059005 | A1 | 2/2021 | Hosseini et al. |
| 2023/0156858 | A1* | 5/2023 | Freda .................... H04W 76/28 370/329 |

FOREIGN PATENT DOCUMENTS

| WO | WO-2022018690 A2 * | 1/2022 |
| WO | WO-2022184651 A1 * | 9/2022 |

(Continued)

OTHER PUBLICATIONS

International Search Report and Written Opinion—PCT/US2022/072533—ISA/EPO—dated Sep. 9, 2022.
(Continued)

*Primary Examiner* — Awet Haile
(74) *Attorney, Agent, or Firm* — QUALCOMM Incorporated

(57) ABSTRACT

Various aspects of the present disclosure generally relate to wireless communication. In some aspects, a first user equipment (UE) may determine, based at least in part on an indication of communication frequency between the first UE and a second UE, a value for a discontinuous reception (DRX) parameter. The UE may transmit, to the second UE, DRX configuration information, the DRX configuration information indicating the value for the DRX parameter. Numerous other aspects are described.

30 Claims, 17 Drawing Sheets

(51) Int. Cl.
*H04W 24/08* (2009.01)
*H04W 72/0453* (2023.01)
*H04W 92/18* (2009.01)

(56) References Cited

FOREIGN PATENT DOCUMENTS

WO    WO-2022212687 A1 * 10/2022
WO    WO-2022240135 A1 * 11/2022

OTHER PUBLICATIONS

Lenovo et al., "Sidelink Resource Allocation for Power Saving", 3GPP TSG RAN WG1 #105-e, R1-2104869, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021 May 12, 2021, XP052011090, 9 Pages, pp. 5,6, section 2.3.

* cited by examiner

DETERMINING DISCONTINUOUS RECEPTION COMMUNICATION PARAMETERS FOR SIDELINK COMMUNICATIONS

FIELD OF THE DISCLOSURE

Aspects of the present disclosure generally relate to wireless communication and to techniques and apparatuses for determining discontinuous reception communication parameters for sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first UE includes determining, based at least in part on an indication of communication frequency between the first UE and a second UE, a value for a discontinuous reception (DRX) parameter; and transmitting, to the second UE, DRX configuration information, the DRX configuration information indicating the value for the DRX parameter.

In some aspects, a method of wireless communication performed by a first UE includes receiving, from a second UE, DRX configuration information, the DRX configuration information indicating a value for a DRX parameter, and the DRX configuration information indicating a channel busy ratio (CBR) configuration for the first UE; and configuring DRX using the DRX configuration information.

In some aspects, a first UE for wireless communication includes a memory; and one or more processors, coupled to the memory, configured to: determine, based at least in part on an indication of communication frequency between the first UE and a second UE, a value for a DRX parameter; and transmit, to the second UE, DRX configuration information, the DRX configuration information indicating the value for the DRX parameter.

In some aspects, a UE for wireless communication includes a memory; and one or more processors, coupled to the memory, configured to: receive, from a second UE, DRX configuration information, the DRX configuration information indicating a value for a DRX parameter, and the DRX configuration information indicating a CBR configuration for the first UE; and configure DRX using the DRX configuration information.

In some aspects, a non-transitory computer-readable medium storing a set of instructions for wireless communication includes one or more instructions that, when executed by one or more processors of a first UE, cause the UE to: determine, based at least in part on an indication of communication frequency between the first UE and a second UE, a value for a DRX parameter; and transmit, to the second UE, DRX configuration information, the DRX configuration information indicating the value for the DRX parameter.

In some aspects, a non-transitory computer-readable medium storing a set of instructions for wireless communication includes one or more instructions that, when executed by one or more processors of an UE, cause the UE to: receive, from a second UE, DRX configuration information, the DRX configuration information indicating a value for a DRX parameter, and the DRX configuration information indicating a CBR configuration for the first UE; and configure DRX using the DRX configuration information.

In some aspects, an apparatus for wireless communication includes means for determining, based at least in part on an indication of communication frequency between the first UE and a second UE, a value for a DRX parameter; and means for transmitting, to the second UE, DRX configuration information, the DRX configuration information indicating the value for the DRX parameter.

In some aspects, an apparatus for wireless communication includes means for receiving, from a second UE, DRX configuration information, the DRX configuration information indicating a value for a DRX parameter, and the DRX configuration information indicating a CBR configuration for the first UE; and means for configuring DRX using the DRX configuration information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
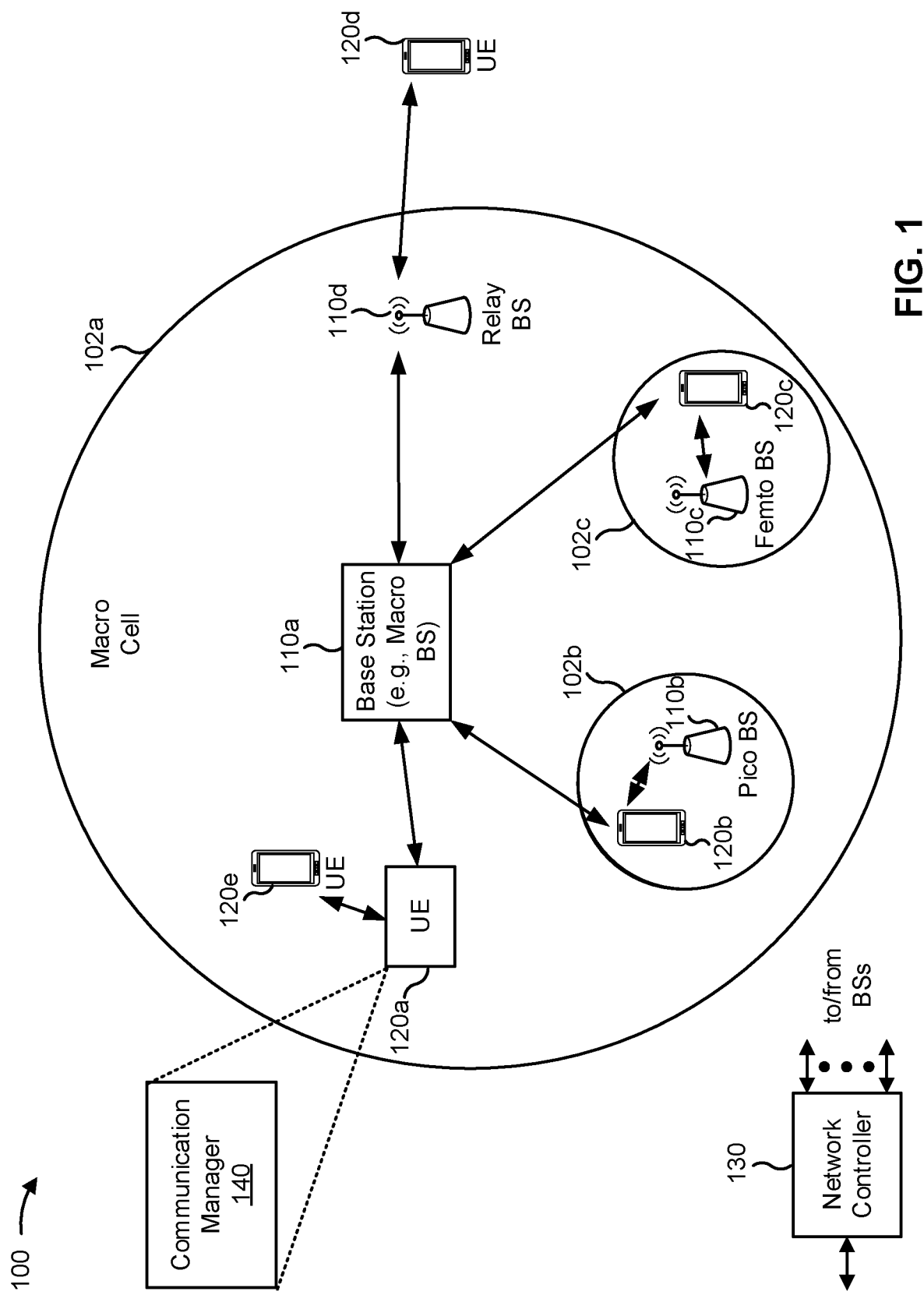
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may determine, based at least in part on an indication of communication frequency between the first UE and a second UE, a value for a discontinuous reception (DRX) parameter; and transmit, to the second UE, DRX configuration information, the DRX configuration information indicating the value for the DRX parameter. In some aspects, the communication manager 140 may receive, from a second UE, DRX configuration information, the DRX configuration information indicating a value for a DRX parameter, and the DRX configuration information indicating a CBR configuration for the first UE; and configure DRX using the DRX configuration information. Additionally, or alternatively, the communication manager 140 may perform one or more other operations described herein.

As indicated above, FIG. 1 is provided as an example. Other examples may differ from what is described with regard to FIG. 1.

Figure 2:
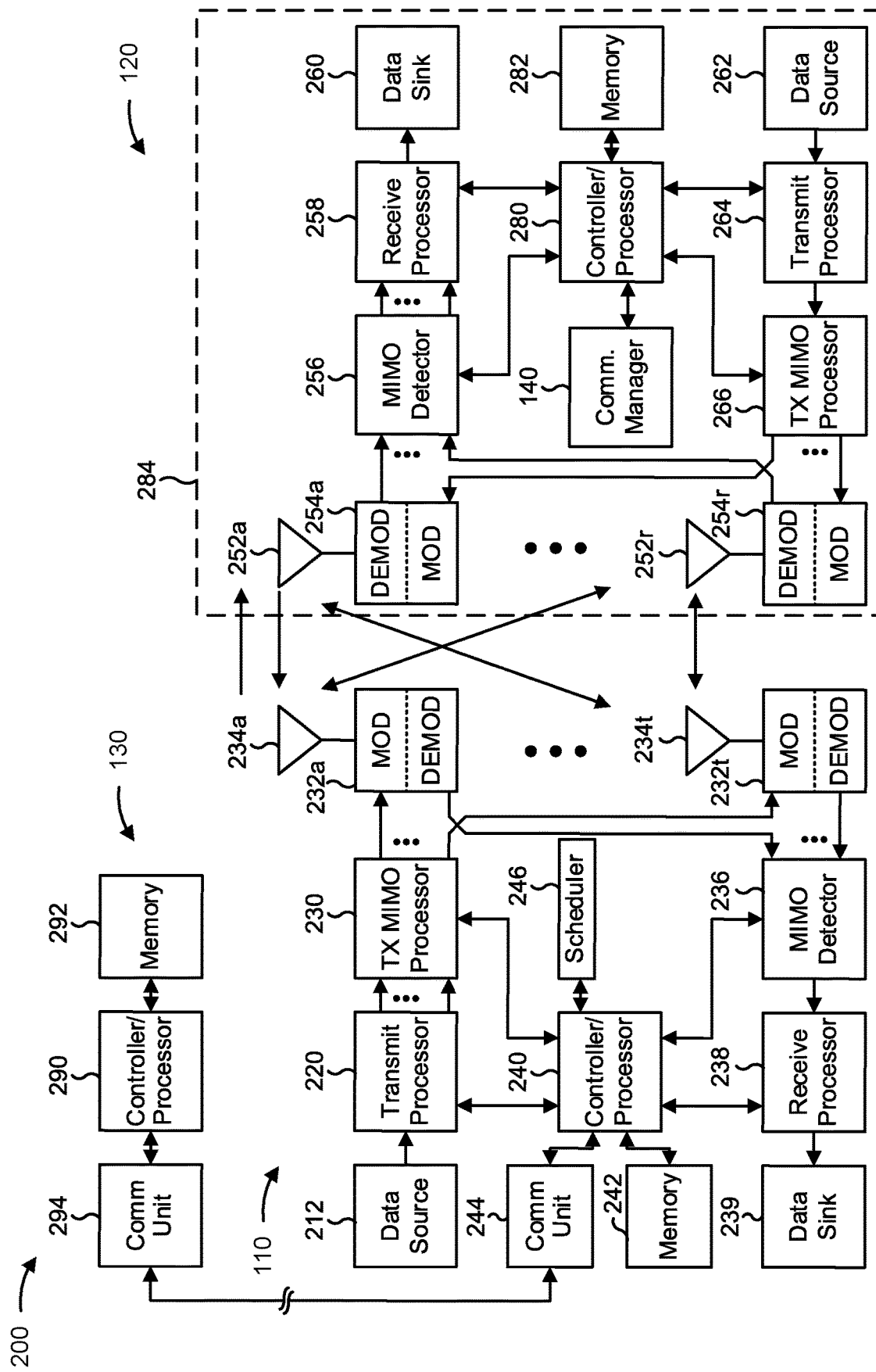
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-14.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-14.

Controller/processor 240 of base station 110, controller/processor 280 of UE 120, and/or any other component(s) of FIG. 2 may perform one or more techniques associated with determining discontinuous reception communication parameters for sidelink communications, as described in more detail elsewhere herein. For example, controller/processor 240 of base station 110, controller/processor 280 of UE 120, and/or any other component(s) of FIG. 2 may perform or direct operations of, for example, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, and/or other processes as described herein. In some aspects, executing instructions may include running the instructions, converting the instructions, compiling the instructions, and/or interpreting the instructions, among other examples.

In some aspects, the first UE includes means for determining, based at least in part on an indication of communication frequency between the first UE and a second UE, a value for a DRX parameter; and/or means for transmitting, to the second UE, DRX configuration information, the DRX configuration information indicating the value for the DRX parameter. The means for the first UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the first UE includes means for receiving, from a second UE, DRX configuration information, the DRX configuration information indicating a value for a DRX parameter, and the DRX configuration information indicating a CBR configuration for the first UE; and/or means for configuring DRX using the DRX configuration information. The means for the first UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
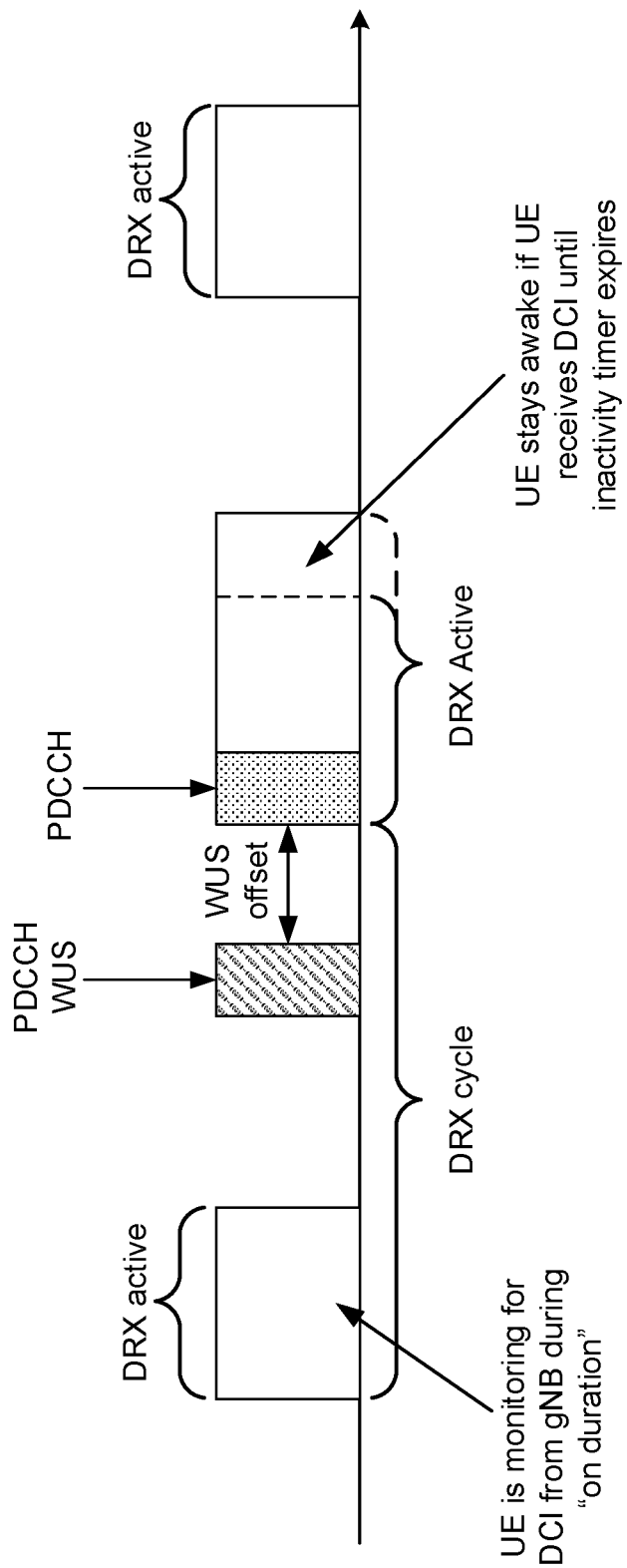
FIG. 3 is a diagram illustrating an example of discontinuous reception (DRX), in accordance with the present disclosure.

FIG. 3 is a diagram illustrating an example 300 of DRX, in accordance with the present disclosure.

As shown in FIG. 3, a UE may be configured to perform DRX in a manner designed to conserve battery life of the UE. For example, the UE may transition to a DRX inactive state (e.g., a sleep mode or off duration) for a DRX inactive duration. While in the DRX inactive state, the UE may refrain from transmitting or receiving on a link between the UE and another device (e.g., a base station, a sidelink UE, and/or the like), may deactivate particular subcarriers or component carriers (e.g., if carrier aggregation is implemented on the access link) of the link, may deactivate one or more components of the UE, and/or the like. Moreover, DRX operation may include periodically transitioning out of the DRX inactive state and into a DRX active state (e.g., an awake mode or on duration) for a DRX active duration to monitor for downlink communications from a BS or sidelink communications from another UE. In some cases, the BS may transmit an instruction to the UE to configure DRX, to cause the UE to perform DRX in accordance with DRX parameters, to transition to a DRX inactive state, and/or the like.

As shown in example 300, when performing DRX, the UE may repeat DRX cycles. Each DRX cycle includes an active portion and an inactive portion. For the inactive portion of the DRX cycle, the UE may be in the DRX inactive state (e.g., conserving battery life), and for the active portion of the DRX cycle, the UE may be in the DRX active state (e.g., monitoring for communications). In some cases, the UE may be configured to use a WUS, such as a physical downlink communication channel (PDCCH) WUS or a sidelink WUS associated with a sidelink channel, to determine whether, for a given DRX cycle, the UE should switch from the DRX inactive state to the DRX active state. For example, a BS or another UE may transmit a WUS to the UE to provide an indication that the UE should switch to the DRX active mode (e.g., for reception of one or more other signals, such as PDCCH, during the DRX active mode). In some cases, if the UE is configured to use a WUS, and a WUS is not received during the DRX inactive state, the UE may not switch to a DRX active state. In this situation, the UE may only switch from the DRX inactive state to the DRX active state based at least in part on receiving a WUS during the DRX inactive state. When a control signal is received during DRX active state, the UE may extend the DRX active duration (e.g., until an inactivity timer expires) to extend the window during which the UE may receive additional control signals. Using the WUS to trigger switching to the DRX active state may enable the UE to further conserve battery life by avoiding unnecessarily switching to the DRX active state.

As noted above, in some cases, a UE may be configured to communicate with another UE (or an integrated access and backhaul (IAB) node may be configured to communicate with another IAB node) over a sidelink, which may be referred to as sidelink communication. In some cases, sidelink communication between UEs might not be scheduled by a BS and may occur at any time. For example, one or more of the UEs may be operating outside of a coverage area of a serving BS or may not be communicatively connected with a serving BS, in which case the one or more UEs may autonomously (or semi-autonomously) schedule the transmission of sidelink communications on the sidelink. Autonomous or semi-autonomous scheduling of sidelink communications may be referred to as Mode 2 sidelink operation, and can be contrasted with Mode 1 sidelink operation, in which a central scheduler (such as a base station) handles scheduling of sidelink communications. In the case of Mode 2 sidelink operation, the BS may be unable to configure DRX operation for a UE, may be unable to instruct the UE to operate in a particular DRX state, and/or the like. However, another UE may be able to configure DRX operation for the UE, provide instructions for the UE to operate in a particular DRX state, and/or the like, via sidelink communication.

As indicated above, FIG. 3 is provided as an example. Other examples may differ from what is described with respect to FIG. 3.

Figure 4:
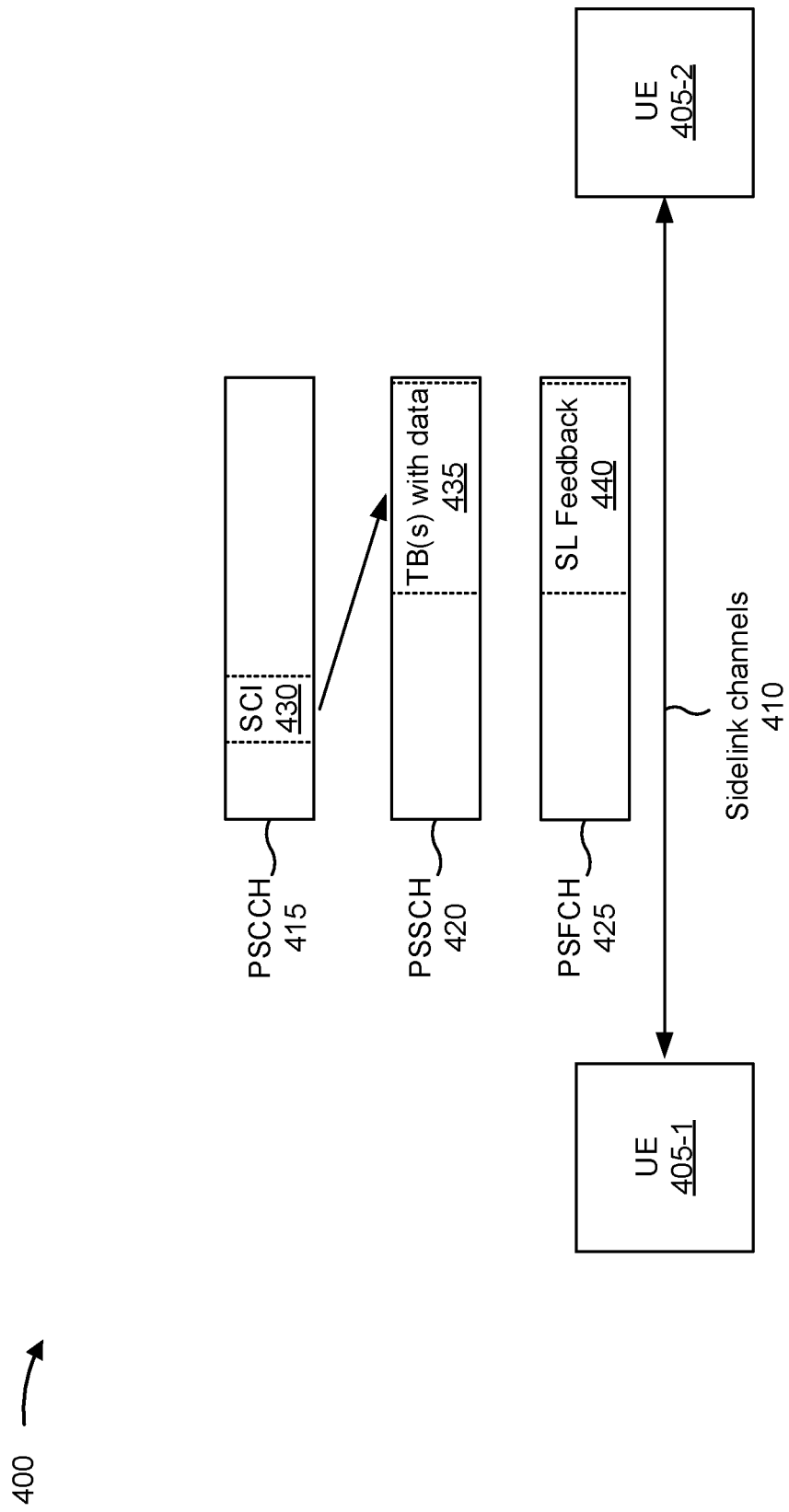
FIG. 4 is a diagram illustrating an example of sidelink communications, in accordance with the present disclosure.

FIG. 4 is a diagram illustrating an example 400 of sidelink communications. As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, vehicle-to-pedestrian (V2P) communications, and/or the like), mesh networking, and/or the like. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, symbols, and/or the like) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, spatial resources, and/or the like) where a transport block (TB) 435 may be carried on the PSSCH 420. The TB 435 may include data. The PSFCH 425 may be used to communicate sidelink feedback 440, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 410 may use resource pools. A resource pool is a configuration indication a group of resources that can be used for sidelink communication. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a central scheduler such as a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources, channel parameters, and/or the like. Additionally, or alternatively, the UE 405 may perform resource selection and/or scheduling by determining a CBR associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more slots to be used for the upcoming sidelink transmission, a modulation and coding scheme (MCS) to be used for the upcoming sidelink transmission, and/or the like. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
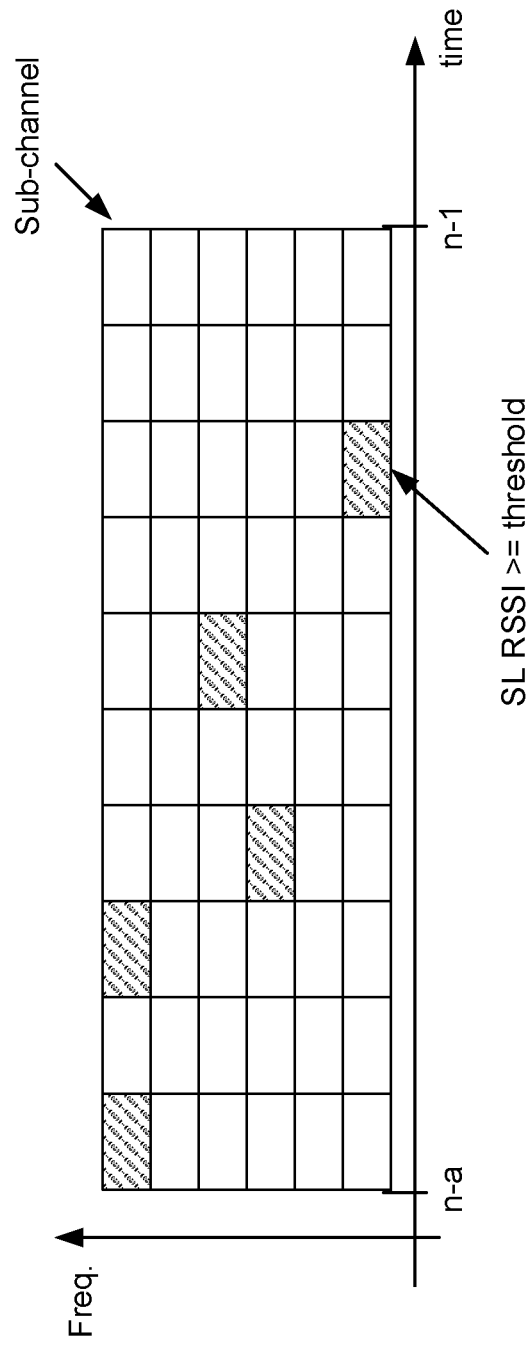
FIG. 5 is a diagram illustrating an example of channel busy ratio (CBR) measurements, in accordance with the present disclosure.

FIG. 5 is a diagram illustrating an example 500 of CBR measurements, in accordance with the present disclosure.

Generally, if a channel to be used for a communication is busy, then the communication may cause interference with or may collide with another transmission on the channel. Thus, when a transmitting UE needs to transmit a sidelink communication to a receiving UE, the transmitting UE should take into consideration how busy the channel is when determining when/whether to transmit the sidelink communication on the sidelink channel. In order to achieve this, the transmitting UE may be configured to monitor a CBR associated with the sidelink channel. A CBR is a measurement indicative of how busy a channel is and, therefore, may indicate a probability of interference or a collision with another transmission on the channel. For example, a CBR may be approximately equal to a number of resources that a UE detects being used on the channel (e.g., based on detecting a received signal strength indicator (RSSI) that satisfies a threshold), divided by a total number of available resources on the channel. A relatively high CBR may indicate that the channel is being frequently used for transmissions, meaning that a probability of interference or collision is relatively high. A relatively low CBR may indicate that the channel is not being used frequently, meaning that a probability of interference or collision is relatively low.

As shown in example 500, CBR measured in slot n may be defined as the portion of sub-channels in a resource pool having a sidelink RSSI (e.g., measured by the UE) satisfying a (pre-)configured threshold sensed over a CBR measurement window [n−a, n−1], wherein a is equal to 100 (equivalent to 12.5 ms at SCS=120 KHz) or $100 \cdot 2^\mu$ slots (equivalent to 100 ms/800 slots at µ=3), according to higher layer parameter timeWindowSize-CBR. Sidelink RSSI may be defined as the linear average of the total received power (in Watts) observed in the configured sub-channel in OFDM symbols of a slot configured for PSCCH and PSSCH, starting from the $2^{nd}$ OFDM symbol.

For frequency Range 1, the reference point for the sidelink RSSI may be the antenna connector of the UE. For frequency Range 2, sidelink RSSI may be measured based at least in part on the combined signal from antenna elements corresponding to a given receiver branch. For Frequency Range 1 and 2, if receiver diversity is in use by the UE, the reported sidelink RSSI value may not be lower than the corresponding sidelink RSSI of any of the individual receiver branches.

In some cases, a sidelink transmitting UE may use a CBR measured by the transmitting UE and a CBR measured by the sidelink receiving UE to select transmission parameters for future sidelink communications with the receiving UE. For example, CBR may be used to select a number of HARQ retransmission, select the number of sub-channels to be used for PSSCH/PSCCH transmissions in a slot, select an MCS, or select a channel occupancy ratio (CR) limit, among other examples.

As indicated above, FIG. 5 is provided as an example. Other examples may differ from what is described with respect to FIG. 5.

As noted above, DRX may conserve UE battery resources by limiting communication resources used while performing DRX operations. Due to communication resource limitations during DRX, using DRX may limit or prevent a sidelink receiving UE from using various resources to determine CBR and/or transmit data indicating the CBR to the sidelink transmitting UE, which may reduce communications quality due to a lack of adequate CBR measurements, which may lead to high resource collision. High resource collision reduces throughput, reduces the reliability of communications, and introduces latency due to delays in communication scheduling.

Some aspects described herein provide techniques and apparatuses for providing sidelink communication parameters (e.g., parameters associated with CBR) during DRX. In some aspects, a UE (e.g., a sidelink receive UE, or SL Rx UE) may provide, to a sidelink UE (e.g., a sidelink transmit UE, or SL Tx UE) DRX configuration information for sidelink communications with the sidelink UE. The DRX configuration information may indicate a CBR configuration of the UE (e.g., data indicating the CBR of the UE, the manner in which CBR for the UE is to be determined, and/or the like). In some aspects, the UE may receive, based at least in part on the DRX configuration information, a communication from the sidelink UE, and one or more parameters associated with the communication may be based at least in part on the CBR configuration of the UE.

As a result, the UE is able to perform DRX to conserve battery and communications resources while also using the DRX configuration information and CBR configuration to provide the sidelink transmit UE with information enabling the sidelink transmit UE to determine one or more parameters for subsequent sidelink communications with the UE. The DRX configuration information and/or CBR configuration may enable better resource selection for future sidelink communications, which may lead to higher quality sidelink communications and less interference with other communications. Providing the DRX configuration information and/or CBR configuration while performing DRX may preserve the battery saving benefits of DRX by using one or more CBR configurations described herein. Thus, throughput is improved, the reliability of communications is improved, and latency due to delays in communication scheduling is reduced.

Figure 6A:
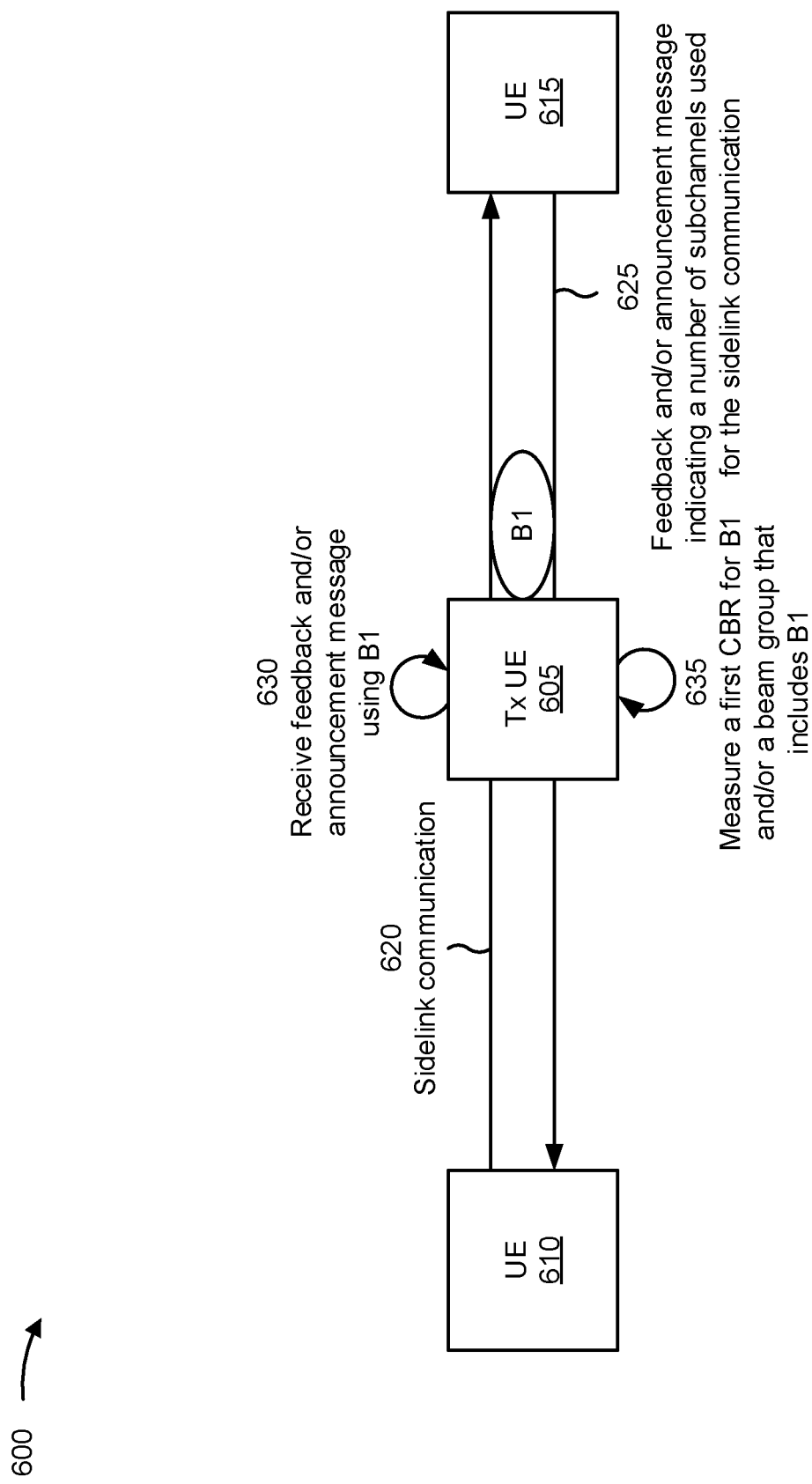
FIGS. 6A-6C are diagrams illustrating an example associated with CBR measurements for sidelink communications, in accordance with the present disclosure.
Figure 6B:
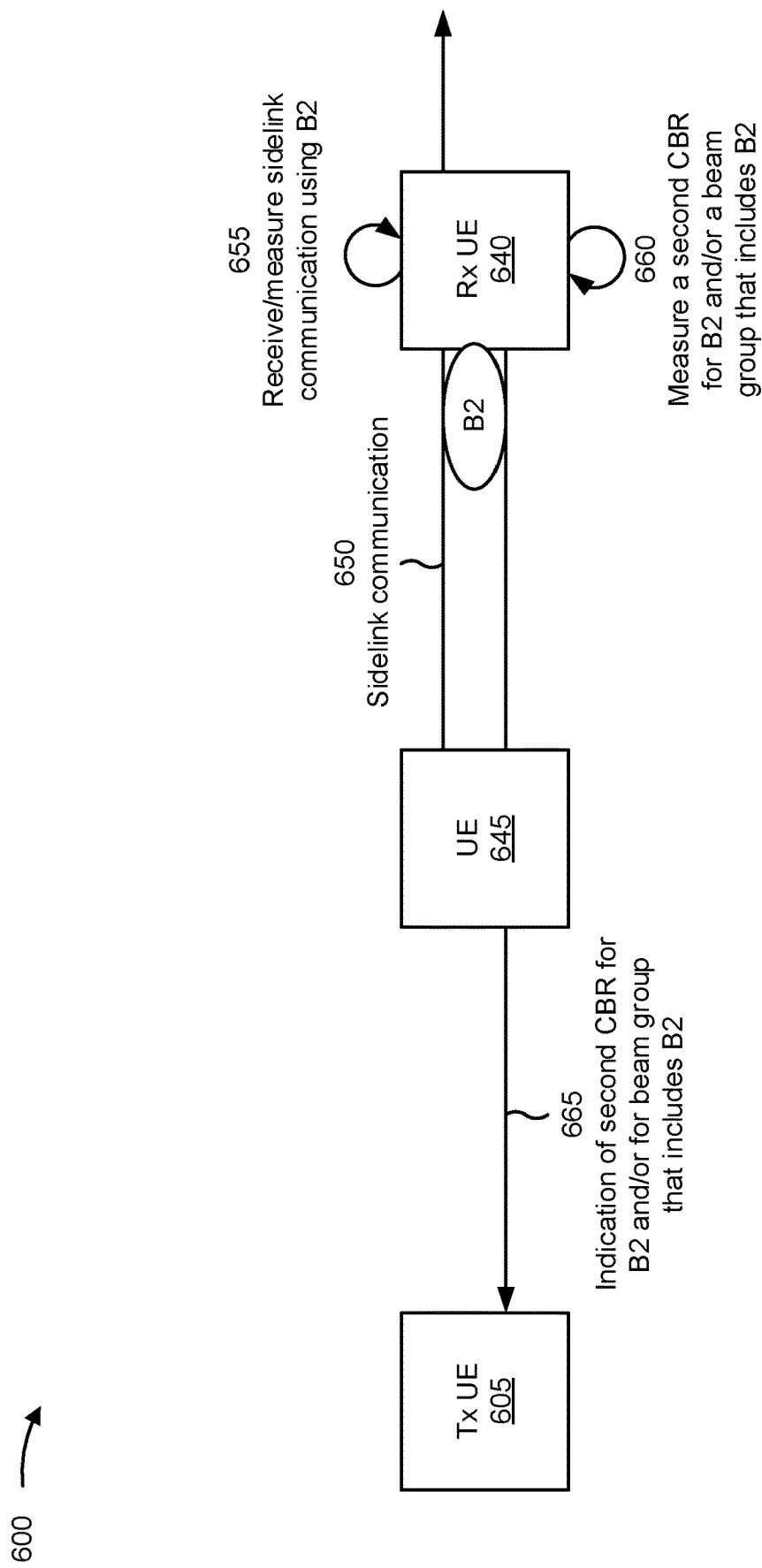
Figure 6C:
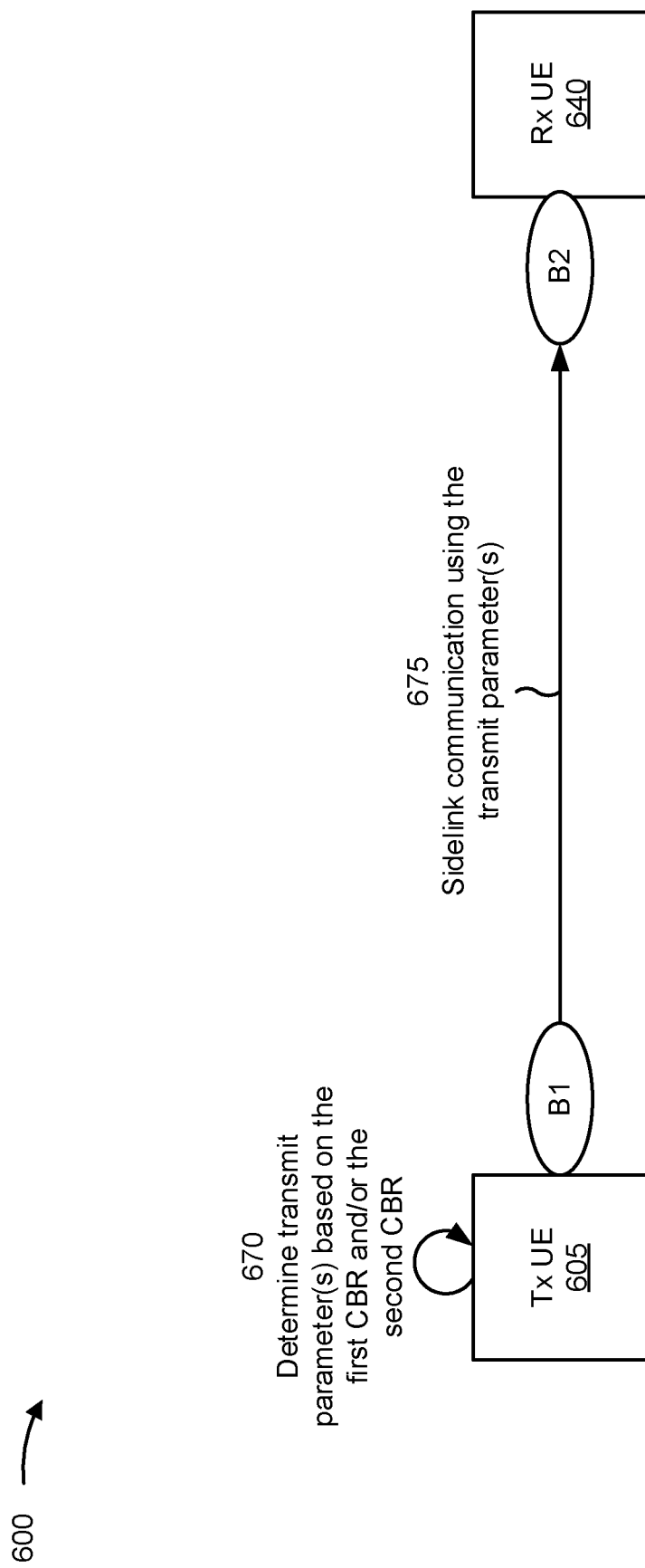

FIGS. 6A-6C are diagrams illustrating an example 600 associated with CBR measurements for sidelink communications, in accordance with various aspects of the present disclosure. As shown in FIGS. 6A-6C, example 600 includes communication between two or more UEs 605, 610, 615 (e.g., UE 120, UE 405). In some aspects, the UEs may be included in a wireless network, such as wireless network 100 or the sidelink communication network described above in connection with FIG. 4. The UEs may communicate via a wireless sidelink, as described above in connection with FIG. 4.

As shown in FIG. 6A, a Tx UE 605 may be capable of transmitting a sidelink communication (e.g., a signal) using a first beam (e.g., B1 as shown in FIG. 6A). The Tx UE 605 may measure a CBR for the first beam and/or for a beam group that includes the first beam to avoid creating collisions or interference at nearby UEs, such as at a UE 615 as shown in FIG. 6A. For example, the Tx UE may measure channel usage using the first beam to determine a level of the channel use (e.g., the CBR) in the spatial direction associated with the first beam.

For example, as shown by reference number 620, a UE 610 may transmit a sidelink communication to the UE 615.

The sidelink communication transmitted by the UE 610 may be received by the UE 615. The sidelink communication may be a PSCCH signal (e.g., carrying SCI and/or resource reservation information) or may be a PSSCH signal. The UE 615 may receive and/or decode the sidelink communication transmitted by the UE 610.

As shown by reference number 625, the UE 615 may transmit, to the UE 610, a feedback communication (e.g., ACK/NACK feedback) based on receiving the sidelink communication on a PSFCH. The feedback communication may include one or more fields (e.g., one or more bits) to indicate a number of resources (e.g., a number of subchannels) used by the sidelink communication. For example, the one or more fields may be added to the feedback communication (e.g., in addition to the ACK/NACK feedback) to indicate the feedback and the number of resources (e.g., the number of subchannels) used by the sidelink communication. Additionally, or alternatively, the UE 615 may transmit or broadcast an announcement message (e.g., a receive (Rx) announcement) indicating a reservation of resources for one or more upcoming sidelink communications. For example, the sidelink communication from the UE 610 may carry SCI that reserves resources (e.g., one or more subchannels) for an upcoming sidelink communication. The UE 615 may transmit the announcement message indicating the number of resources (e.g., the number of subchannels) for the upcoming sidelink communication.

As shown by reference number 630, the Tx UE 605 may receive the feedback communication and/or the announcement message from the UE 615 using the first beam (and/or one or more other beams included in a beam group that includes the first beam). For example, as shown in FIG. 6A, the feedback communication and/or the announcement message may be transmitted to the UE 610 in a spatial direction such that the Tx UE 605 is enabled to receive the feedback communication and/or the announcement message using the first beam. This enables the Tx UE 605 to identify channel use in the spatial direction of the first beam, as described in more detail below.

As shown by reference number 635, the Tx UE 605 may measure a first CBR (e.g., a Tx CBR) for the first beam and/or for a beam group that includes the first beam (e.g., a first beam group). For example, the Tx UE 605 may identify the number of resources (e.g., the number of subchannels) used or reserved by the UE 615 based at least in part on the feedback communication and/or the announcement message.

The Tx UE 605 may measure the first CBR over a measurement window. For example, the Tx UE 605 may monitor for feedback communications and/or the announcement messages using the first beam and/or using beams included in the first beam group during the measurement window. The Tx UE 605 may determine the number of resources (e.g., the number of subchannels) in which there were sidelink communications (e.g., PSSCH transmissions), as computed by the Tx UE 605 based at least in part on feedback communications and/or announcement messages received by the Tx UE 605 on the first beam or on beams included in the first beam group during the measurement window. The Tx UE 605 may determine the first CBR based at least in part on the number of resources (e.g., the number of subchannels) identified during the measurement window.

As a result, the Tx UE 605 is enabled to determine a channel use for nearby Rx UEs, such as UE 615. For example, if the Tx UE 605 determines a relatively high CBR for the first CBR, then the first CBR may indicate a busy channel (e.g., a high number of UEs near the Tx UE 605 (in the spatial direction of the first beam) receiving communications). If the Tx UE 605 determines a relatively low CBR for the first CBR, then the first CBR may indicate an idle channel (e.g., a low number of UEs near the Tx UE 605 (in the spatial direction of the first beam) receiving communications).

As shown in FIG. 6B, an Rx UE 640 (e.g., UE 120, UE 405) may be the intended recipient of the sidelink communication from the Tx UE 605 (e.g., that is to be transmitted using the first beam, as described above). For example, the Rx UE 640 may intend to receive the sidelink communication from the Tx UE 605 using a second beam (e.g., B2 as shown in FIG. 6B). The second beam may be included in a beam group (e.g., a second beam group) of the Rx UE 640.

In some aspects, the Rx UE 640 may be configured to monitor channel use in the spatial direction of the second beam and/or the second beam group. For example, one or more UEs, such as a UE 645 (e.g., UE 120, UE 405) as shown in FIG. 6B, may transmit in a spatial direction of the second beam and/or the second beam group. For example, as shown by reference number 650, the UE 645 may transmit a sidelink communication in the spatial direction of the second beam and/or the second beam group. The sidelink communication may be a PSCCH signal (e.g., carrying SCI) or a PSSCH signal. The sidelink communication may be intended for another Rx UE (not shown in FIG. 6B).

As shown by reference number 655, in some aspects, the Rx UE 640 may receive, detect, and/or measure the sidelink communication using the second beam and/or another beam included in the second beam group of the Rx UE 640. For example, the Rx UE 640 may measure an RSSI (e.g., a sidelink RSSI (SL-RSSI)) of the sidelink communication using the second beam and/or another beam included in the second beam group. The SL-RSSI may be defined by a wireless communication standard, such as a 3GPP Specification. For example, the SL-RSSI may be a linear average of the total received power observed in a configured subchannel in OFDM symbols of a slot configured for PSCCH and PSSCH (e.g., starting from the second OFDM symbol of the slot).

As shown by reference number 660, in some aspects, the Rx UE 640 may measure a second CBR (e.g., an Rx CBR) for the second beam and/or for the second beam group. For example, the Rx UE 640 may monitor for sidelink communications using the second beam and/or the second beam group to measure the SL-RSSI of the sidelink communications (e.g., in a similar manner as described above). The Rx UE 640 may measure the second CBR based at least in part on a number of subchannels associated with an SL-RSSI value that satisfies a threshold over a measurement window. The Rx UE 640 may measure the second CBR for the second beam (e.g., using measured SL-RSSI on the second beam) and/or for the second beam group (e.g., using measured SL-RSSI on any beam included in the second beam group).

As a result, in some aspects, the Rx UE 640 is enabled to determine a channel use in the receive direction (e.g., in the spatial direction of the second beam). For example, if the Rx UE 640 determines a relatively high CBR (e.g., 1 or near 1, on a scale from 0 to 1, where 1 indicates a busy channel and 0 indicates an idle channel) for the second CBR, then the second CBR may indicate that the channel is busy in the receive direction (e.g., that there is a high number of UEs transmitting in the spatial direction of the second beam). If the Rx UE 640 determines a relatively low CBR (e.g., 0 or near 0 on a scale from 0 to 1) for the second CBR, then the second CBR may indicate that the channel is idle in the receive direction (e.g., that there is a low number of UEs transmitting in the spatial direction of the second beam).

As shown by reference number 665, in some aspects, the Rx UE 640 may transmit, and the Tx UE 605 may receive, an indication of the second CBR (e.g., the Rx CBR) for the second beam and/or for the second beam group. In some aspects, the indication of the second CBR may be indicated by a CBR configuration of the Rx UE 640, which may be indicated by DRX configuration information provided to the Tx UE 605 prior to or with the indication of the second CBR. By transmitting the indication of the second CBR, the Tx UE 605 is enabled to identify a channel use (e.g., the second CBR) detected at the Rx UE 640 and determine one or more parameters for the sidelink communication to the Rx UE 640 based at least in part on the channel use at the Rx 640, as described in more detail below.

In some aspects, the Rx UE 640 may be associated with a CBR configuration, indicated by the DRX configuration information of the Rx UE 640, that indicates the one or more parameters are predetermined and independent of a CBR metric associated with a set of resources used to receive the communication. In this situation, the Rx UE 640 may forego determining CBR prior to receiving sidelink communications from the Tx UE 605. In some aspects, after receiving a sidelink communication from the Tx UE 605, the Rx UE 640 may measure at least one parameter, of the one or more parameters, for the set of resources used to receive the communication, as described above. The Rx UE 640 may then transmit, to the Tx UE 605, a subsequent communication that includes a measurement of the at least one parameter (e.g., the CBR measured by the Rx UE 640). In this situation, while an initial sidelink communication may not have a CBR measurement from the Rx UE 640, subsequent sidelink communications between the Rx UE 640 and the Tx UE 605 may be based at least in part on CBR measurements from the Rx UE 640.

As shown in FIG. 6C, and by reference number 670, the Tx UE 605 may determine one or more parameters, for the sidelink communication to the Rx UE 640, based at least in part on the first CBR and/or the second CBR. The one or more parameters may include a number of HARQ retransmissions for the sidelink communication, a number of subchannels to be used by the Tx UE 605 (e.g., in a slot), an MCS to be used for the sidelink communication, and/or a CR limit (e.g., for the Tx UE 605 or the Rx UE 640), among other examples.

In some aspects, the Tx UE 605 may determine, based at least in part on the CBR configuration of the Rx UE 640, the one or more parameters (e.g., transmit parameters) for communication with the Rx UE 640. The CBR configuration may be indicated by DRX configuration information obtained by the Tx UE 605 for communications with the Rx UE 640. For example, in some situations, the DRX configuration and/or CBR configuration may have been previously negotiated between the Tx UE 605 and the Rx UE 640. In this situation, the Tx UE 605 may determine the one or more parameters based at least in part on the DRX and/or CBR configuration of the Rx UE 640.

In some aspects, the CBR configuration indicates that the one or more parameters are predetermined and independent of a CBR associated with a set of resources used to receive the communication. In this situation, the Tx UE 605 may not use the second CBR in determining the one or more parameters of a first transmission to the Rx UE 640.

In some aspects, as noted above, after receiving a sidelink communication from the Tx UE 605, the Rx UE 640 may measure at least one parameter associated with the CBR and transmit a result (e.g., a report) indicating the second CBR. In this situation, the Tx UE 605 may update at least one parameter, of the one or more parameters (e.g., used for sidelink communications to the Rx UE 640), based at least in part on receiving the result from the Rx UE 640. The Tx UE 605 may transmit subsequent sidelink communications to the Rx UE 640 and the Tx UE 605 based at least in part on the updated one or more parameters (e.g., based at least in part on the second CBR).

As shown by reference number 675, the Tx UE 605 may transmit, to the Rx UE 640, the sidelink communication using the one or more parameters (e.g., determined by the Tx UE 605 as described above). The Tx UE 605 may transmit the sidelink communication using the first beam (e.g., B1). The Rx UE 640 may receive the sidelink communication using the second beam (e.g., B2). As a result, the Tx UE 605 may ensure that the sidelink communication has a low probability or likelihood of causing collisions and/or interference (e.g., if the first CBR and/or second CBR is a relatively high CBR, indicating a busy channel) by using a lower number of HARQ retransmissions, a lower number of subchannels, a lower order MCS, and/or a lower CR limit, among other examples. Similarly, the Tx UE 605 may improve a communication performance of the sidelink communication (e.g., if the first CBR and/or second CBR is a relatively low CBR, indicating an idle channel) by using a greater number of HARQ retransmissions, a greater number of subchannels, a higher order MCS, and/or a greater CR limit, among other examples.

Moreover, by using a beamformed CBR as described above, the Tx UE 605 may be enabled to identify when the Tx UE 605 is transmitting into a busy portion of the network (e.g., with a relatively high CBR) and use transmit parameters that reduce a likelihood or a probability of interference or collision with other transmissions. Similarly, the Tx UE 605 may be enabled to identify when the Tx UE 605 is transmitting into an idle portion of the network (e.g., with a relatively low CBR) and use transmit parameters that increase a communication performance of the sidelink communication.

While not depicted in example 600, the Tx UE 605 and/or the Rx UE 640 may determine CBR in a variety of ways (e.g., based at least in part on their respective CBR configuration). As discussed in further detail below, in some aspects, the manner in which Tx UE 605 and/or Rx UE 640 determine CBR may be affected by the DRX configurations of the respective devices, in a manner designed to provide CBR measurements while conserving UE battery life benefits of performing DRX.

As indicated above, FIGS. 6A-6C are provided as examples. Other examples may differ from what is described with respect to FIGS. 6A-6C.

Figure 7:
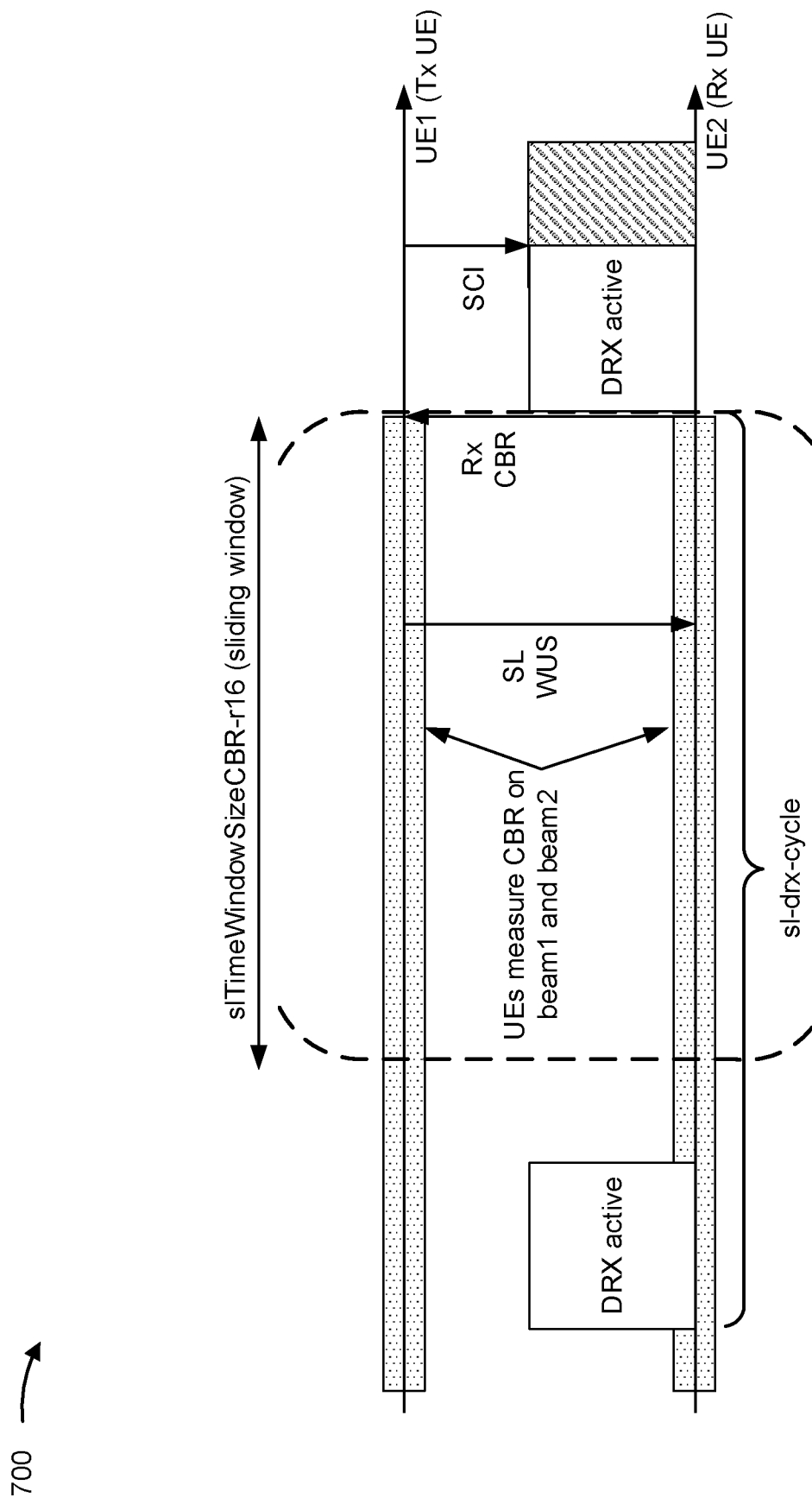
FIGS. 7-10 are diagrams illustrating examples associated with sidelink communication parameters for DRX communications, in accordance with the present disclosure.

FIG. 7 is a diagram illustrating an example 700 of sidelink communication parameters for DRX communications, in accordance with the present disclosure. As shown in FIG. 7, a UE (e.g., UE 120, shown as UE2 (Rx UE)) may measure CBR while performing DRX to facilitate sidelink communications with another UE (e.g., UE 120, shown as UE1 (Tx UE)).

In some aspects, the CBR configuration of the UE may indicate that the UE is to continuously measure at least one CBR metric (e.g., RSSI). In some aspects, the UE may continuously measure the at least one CBR metric for a set of resources associated with receiving a subsequent communication from a sidelink UE. The UE may transmit, to the sidelink UE and based at least in part on the continuous measuring, one or more values (e.g., values for RSSI and/or CBR, among other examples) associated with the at least one CBR metric.

For example, as shown in example 700, the Tx UE and the Rx UE may both measure RSSI and/or CBR throughout a DRX cycle. In some aspects, the UE may measure RSSI and/or CBR for resources within a sliding window, such as a sliding window parameter (e.g., shown as the slTimeWindowSizeCBR-r16 parameter). In some aspects, the continuous measurements may pause when the UE enters an active DRX state. For example, as shown in the example 700, after the Tx UE transmits, and the Rx UE receives, the sidelink WUS, the Rx UE provides a CBR measurement, or at least one metric (e.g., RSSI) enabling the Tx UE to calculate CBR for the Rx UE. During the next active DRX state, the UEs may pause continuous measurement, and the Tx UE may transmit, and the Rx UE may receive, SCI via sidelink communications (e.g., based on transmit parameters determined based at least in part on the Rx CBR). Such a CBR configuration may be beneficial, for example, in situations where measuring RSSI does not consume much power compared to searching and processing for SCI.

In some aspects, the CBR configuration may indicate that the UE is to measure at least one CBR metric at a same time as the sidelink UE is to measure another CBR metric. For example, the CBR configuration may indicate that the Tx UE is to measure Tx CBR at the same time the Rx UE is to measure Rx CBR. In some aspects, as mentioned above, the one or more parameters (e.g., transmit parameters determined by the Tx UE) include at least one of a number of HARQs, an MCS, a number of sub channels, or a CR limit.

As indicated above, FIG. 7 is provided as an example. Other examples may differ from what is described with respect to FIG. 7.

Figure 8:
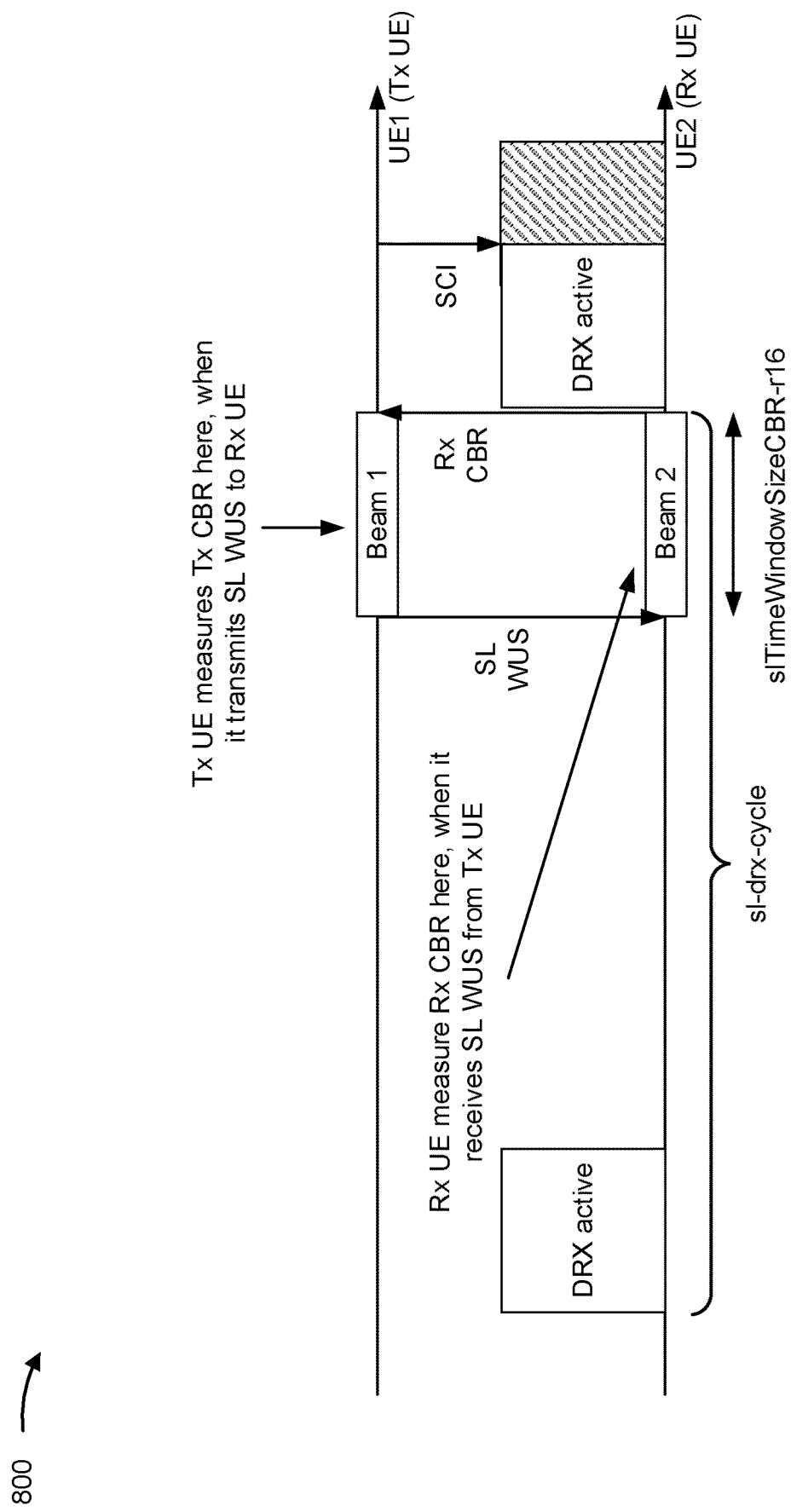

FIG. 8 is a diagram illustrating an example 800 of sidelink communication parameters for DRX communications, in accordance with the present disclosure. As shown in FIG. 8, a UE (e.g., UE 120, shown as UE2 (Rx UE)) may measure CBR while performing DRX to facilitate sidelink communications with another UE (e.g., UE 120, shown as UE1 (Tx UE)).

In some aspects, the CBR configuration of the UE may indicate that the UE is to measure at least one CBR metric in response to receiving, from a sidelink UE, a sidelink WUS. In some aspects, the UE (e.g., Rx UE) may receive the sidelink WUS from the sidelink UE (e.g., Tx UE) and measure, based at least in part on receiving the sidelink WUS and the CBR configuration, the at least one CBR metric for a set of resources associated with receiving subsequent communications from the sidelink UE. The UE may transmit, to the sidelink UE and based at least in part on measuring the at least one CBR metric, one or more values (e.g., values for RSSI, and/or CBR, among other examples) associated with the at least one CBR metric.

In some aspects, the communication received by the Rx UE (e.g., sidelink WUS or other signal from Tx UE) may include information associated with measuring CBR of a set of resources associated with the communication. For example, in a situation where the Rx UE receives a sidelink WUS, the sidelink WUS may indicate the resources (e.g., time, frequency, and/or spatial (e.g., beam) resources) for which CBR is to be measured.

In some aspects, the UE (e.g., Tx UE) may receive, based at least in part on the sidelink WUS, one or more values associated with the at least one CBR metric. The UE may update at least one parameter (e.g., transmit parameters), of the one or more parameters, based at least in part on the one or more values. The UE may then transmit a subsequent communication using the at least one updated parameter.

For example, as shown in example 800, the Tx UE and the Rx UE may measure RSSI and/or CBR in the time between the SL WUS being transmitted/received and the active DRX state. The Tx UE measures CBR after transmitting the sidelink WUS to the Rx UE, and the Rx UE measures CBR after receiving the sidelink WUS from the Tx UE. The Rx UE provides, to the Tx UE, one or more values associated with the at least one CBR metric just before switching to the active DRX state. In some aspects, if sidelink WUS is not configured or used, the UE may behave as though the sidelink WUS was sent and received at every occasion. A CBR configuration based on measuring CBR after transmitting/receiving the sidelink WUS may be beneficial by limiting the resource usage of the UEs to measuring CBR only in a window of time shortly before the CBR values are to be used for the sidelink communications, which may conserve UE resources, such as battery and/or communication resources.

As indicated above, FIG. 8 is provided as an example. Other examples may differ from what is described with respect to FIG. 8.

Figure 9:
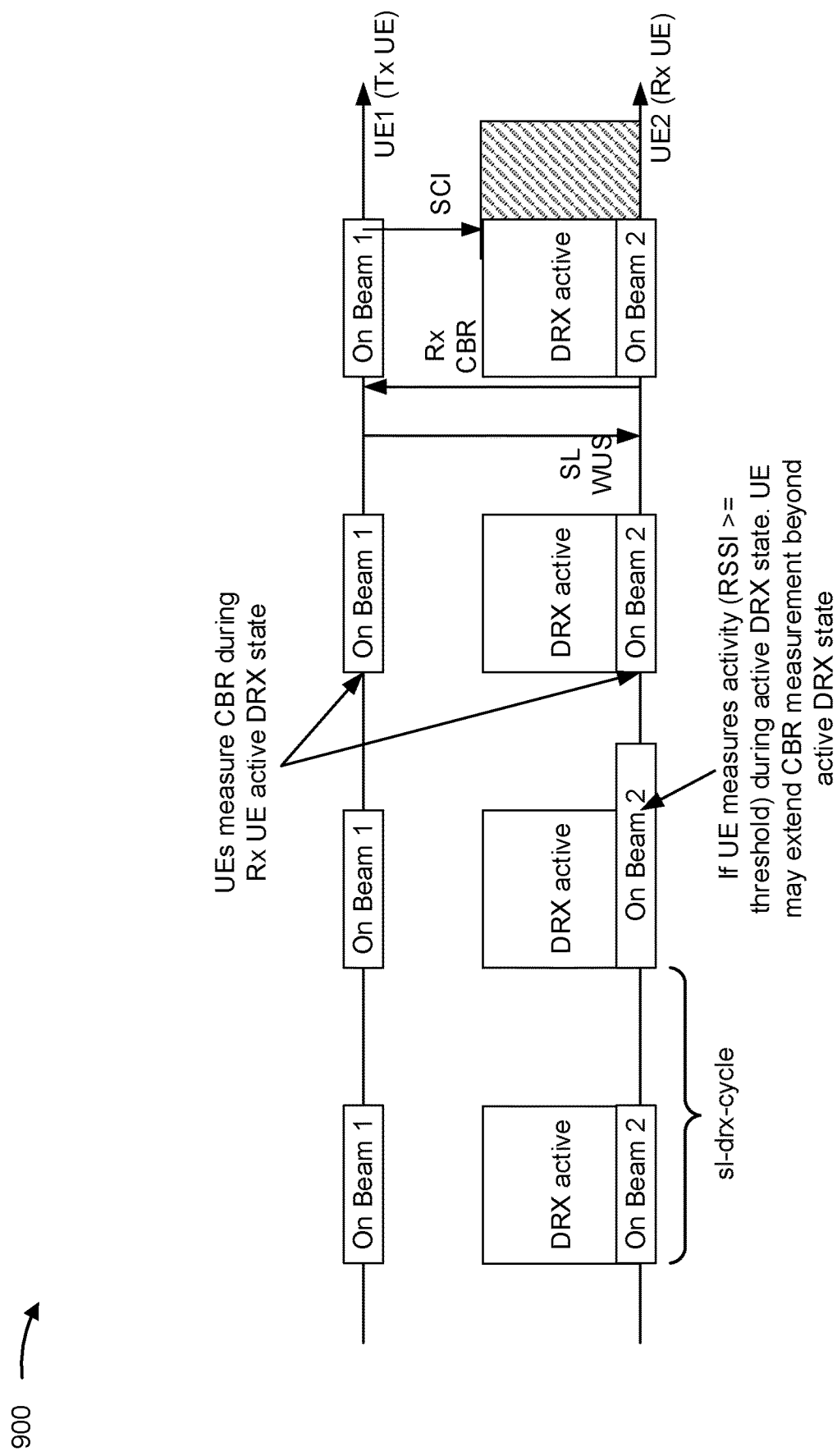

FIG. 9 is a diagram illustrating an example 900 of sidelink communication parameters for DRX communications, in accordance with the present disclosure. As shown in FIG. 9, a UE (e.g., UE 120, shown as UE2 (Rx UE)) may measure CBR while performing DRX to facilitate sidelink communications with another UE (e.g., UE 120, shown as UE1 (Tx UE)).

In some aspects, the CBR configuration of the UE may indicate that the UE is to measure at least one CBR metric during an active monitoring state of a DRX cycle of the UE. In some aspects, the UE (e.g., Rx UE or Tx UE) may measure, during the active DRX state, the at least one CBR metric for a set of resources associated with receiving (e.g., for the Rx UE) or transmitting (e.g., for the Tx UE) subsequent communications. The UE (e.g., Rx UE) may transmit, to the sidelink UE (e.g., Tx UE) and based at least in part on measuring the at least one CBR metric, one or more values (e.g., values for RSSI, and/or CBR, among other examples) associated with the CBR metric.

In some aspects, the UE may extend, based at least in part on the at least one CBR metric failing to satisfy a threshold metric, measurement of the at least one CBR metric beyond the active monitoring state of the DRX cycle. For example, in a situation where the CBR is relatively high, the UE may continue to measure CBR beyond the active DRX state in a manner designed to identify resources with a lower CBR (e.g., a CBR that satisfies the threshold.

For example, as shown in example 900, the Tx UE and the Rx UE may measure RSSI and/or CBR during the active DRX state of each DRX cycle. The Rx UE may provide, to the Tx UE, one or more values associated with the at least one CBR metric just before switching to the active DRX state. Such a CBR configuration may be beneficial by limiting the resource usage of the UEs to measuring CBR only during periods of time where the UE is already actively monitoring for SCI, or during short extension periods, which may conserve UE resources, such as battery and/or communication resources.

As indicated above, FIG. 9 is provided as an example. Other examples may differ from what is described with respect to FIG. 9.

Figure 10:
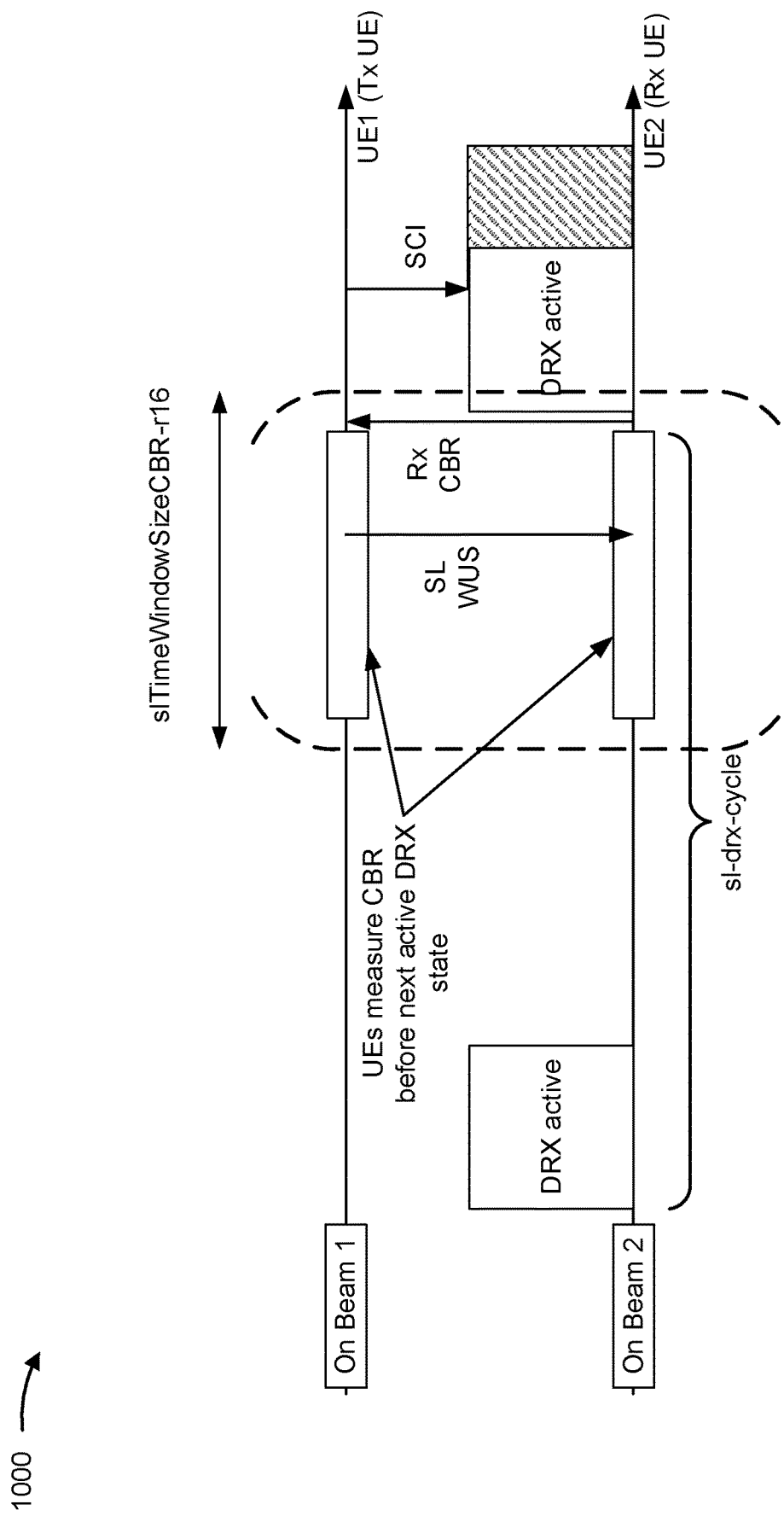

FIG. 10 is a diagram illustrating an example 1000 of sidelink communication parameters for DRX communications, in accordance with the present disclosure. As shown in FIG. 10, a UE (e.g., UE 120, shown as UE2 (Rx UE)) may measure CBR while performing DRX to facilitate sidelink communications with another UE (e.g., UE 120, shown as UE1 (Tx UE)).

In some aspects, the CBR configuration of the UE may indicate that the UE is to measure the at least one CBR metric during a period of time prior to the active monitoring state of the DRX cycle. The monitored set of resources may be for a set of resources associated with receiving subsequent communications from the sidelink UE. The UE (e.g., Rx UE) may transmit, to the sidelink UE (e.g., Tx UE) and based at least in part on measuring the at least one CBR metric, one or more values (e.g., values for RSSI, and/or CBR, among other examples) associated with the CBR metric.

For example, as shown in example 1000, the Tx UE and the Rx UE may measure RSSI and/or CBR during a period of time prior to the active DRX state of each DRX cycle. In some aspects, the period of time may be preconfigured (e.g., based on a slTimeWindowSizeCBR-r16 parameter or the like). The Rx UE may provide, to the Tx UE, one or more values associated with the at least one CBR metric just before switching to the active DRX state. Such a CBR configuration may be beneficial by limiting the resource usage of the UEs to measuring CBR only during periods of time shortly before the CBR might be used by the Tx UE to determine the one or more parameters (e.g., transmit parameters), which may conserve UE resources, such as battery and/or communication resources.

As indicated above, FIG. 10 is provided as an example. Other examples may differ from what is described with respect to FIG. 10.

In some aspects, as described above, the CBR configuration of the UE may indicate that the UE is to forego CBR measurement. In this situation, the one or more parameters (e.g., transmit parameters) may be fixed or preconfigured. In some aspects, after a first transmission occurs using one or more fixed parameters, the Rx UE may measure CBR associated with the resources of the first transmission, report the CBR measurements to the Tx UE, and the Tx UE may use the CBR measurements provided by the Rx UE to update the one or more parameters for subsequent transmissions.

In this way, a UE is able to perform DRX to conserve battery and communications resources while also using the DRX configuration information and CBR configuration to provide a sidelink transmit UE with information enabling the sidelink transmit UE to determine one or more parameters for subsequent sidelink communications with the UE. The DRX configuration information and/or CBR configuration may enable better resource selection for future sidelink communications, which may lead to higher quality sidelink communications and less interference with other communications. Providing the DRX configuration information and/or CBR configuration while performing DRX may preserve the battery saving benefits of DRX by using one or more CBR configurations described herein.

Figure 11:
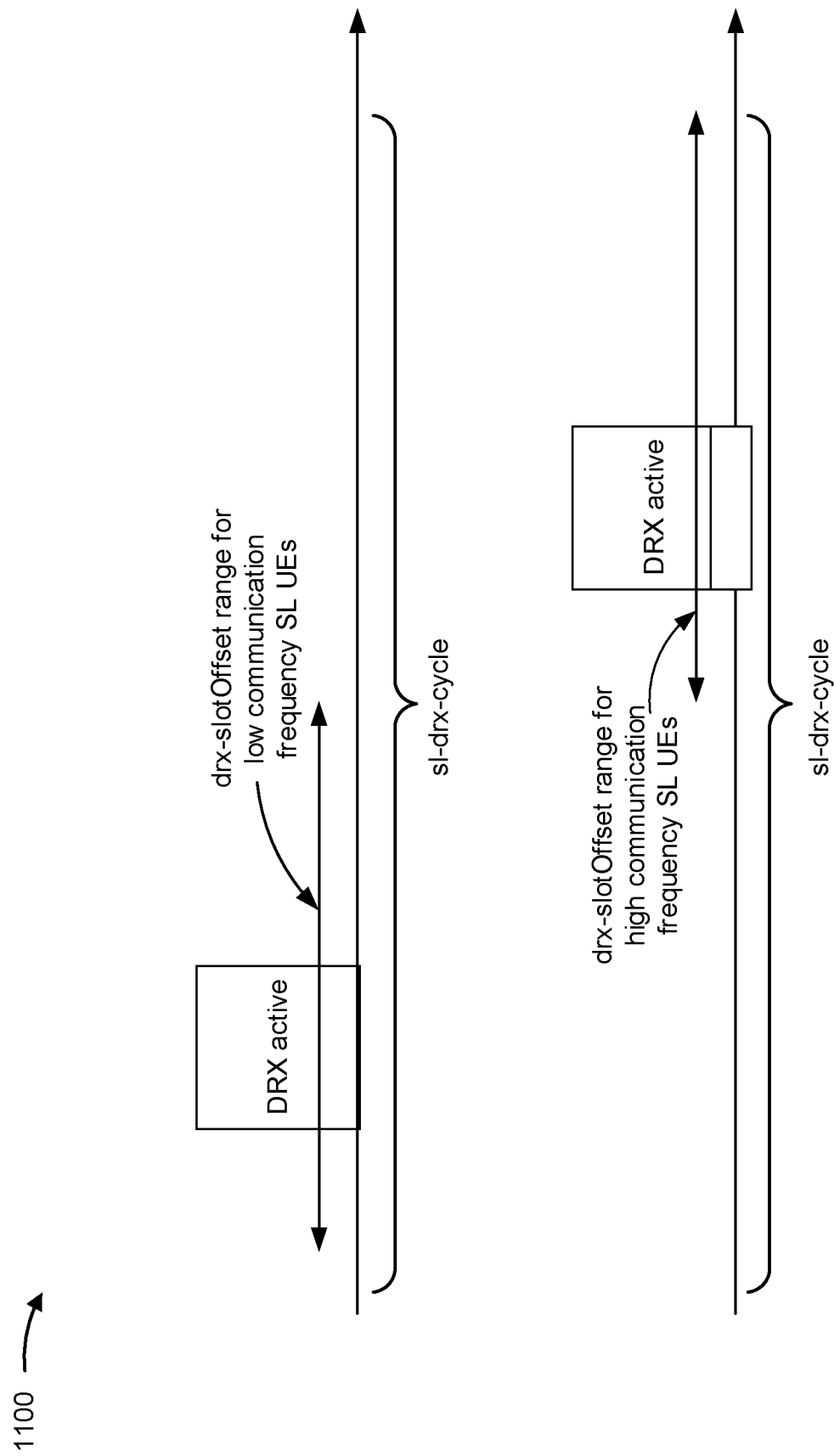
FIGS. 11 and 12 are diagrams illustrating examples associated with determining sidelink communication parameters for DRX communications, in accordance with the present disclosure.

FIG. 11 is a diagram illustrating an example process 1100 associated with determining sidelink communication parameters for DRX communications, in accordance with the present disclosure. As shown in FIG. 11, a UE (e.g., UE 120) may selectively determine a manner in which to measure CBR during DRX.

In some aspects, a first UE (e.g., a Tx UE) may determine, based at least in part on an indication of communication frequency between the first UE and a second UE (e.g., an Rx UE), a value for a DRX parameter. The first UE may then transmit, to the second UE, DRX configuration information that indicates the value for the DRX parameter.

In some aspects, the indication of communication frequency may indicate a probability that the first UE will transmit a communication to the second UE or a CR measurement. For example, the indication of communication frequency may be designed to indicate how often the first UE will transmit to the second UE. Depending on the types of communications, the first UE may transmit to the second UE on a regular basis or a more sporadic, or bursty, basis. For example, if the transmission include streaming data, such as audio data, video data, and/or a file transfer, among other examples, the communication frequency may be expected to be relatively high, or regular, as opposed to transmissions that include keep-alive communications, and/or UE notifications, among other examples. In some aspects, the CR measurement may be used to determine the communication frequency (e.g., a higher CR measurement may indicate more frequent communications, while a lower CR measurement may indicate less frequent communications). In some aspects, whether communication frequency is high or low may be determined in a relative manner. For example, the UEs that are in a highest 50% of communication frequency may be considered to have a high communication frequency, while UEs that are in a lowest 50% of communication frequency may be considered to have low communication frequency.

In some aspects, the DRX parameter may include an offset parameter indicating a time gap between a beginning of a DRX cycle and an active monitoring state of the DRX cycle. For example, as shown in example 1100, a first offset range is shown for UEs with a low communication frequency, and a second offset range is shown for UEs with a high communication frequency. In this example, the offset range for any of the UEs with a low communication frequency is in the first half of the DRX cycle, such that any UE with a low frequency of communication will have an active DRX state occur in the first range (e.g., in the first half of the DRX cycle). The offset range for any UEs with a high communication frequency is in the second half of the DRX cycle, such that any UE with a high frequency of communication will have an active DRX state occur in the second range (e.g., in the second half of the DRX cycle). The offset parameter for any given UE may cause the active DRX state to occur anywhere within its corresponding range, and UEs associated with the same range need not have the same offset parameter. For example, multiple different UEs with different offset parameters may have an active DRX state in the first or the second range.

In some aspects, the DRX configuration information includes data identifying one of a plurality of different types of CBR configurations. For example, the DRX configuration information may identify any of the CBR configurations described with respect to FIGS. 6-10. In some aspects, a first type of CBR configuration, of the different types of CBR configuration, may indicate that the first UE (e.g., Rx UE or Tx UE) is to measure at least one CBR metric during an active monitoring state of a DRX cycle (e.g., as described with respect to FIG. 9). Additionally, or alternatively, a second type of CBR configuration, of the different types of CBR configuration, may indicate that the first UE is to forego measuring the at least one CBR metric during the active monitoring state of the DRX cycle (e.g., as described with respect to FIGS. 6 and 10). As shown in example 1100, the low communication frequency UEs may forego measuring CBR at all, as the low communication frequency may not warrant frequent CBR measurements. The high frequency UEs, on the other hand, may use a different CBR configuration, which in this example corresponds to the CBR configuration described with respect to FIG. 9, where CBR measurements (e.g., RSSI measurements) occur during the active DRX state.

In some aspects, the different types of CBR configurations may include: a first CBR configuration indicating that one or more parameters for a communication between the first UE and the second UE are predetermined and independent of a CBR metric associated with a set of resources used to transmit the communication (e.g., as described with respect to FIGS. 6 and 10), a second CBR configuration indicating that the one or more parameters for the communication between the first UE and the second UE are to be based at least in part on measurements measured based at least in part on the first UE transmitting a sidelink WUS to the second UE (e.g., as described with respect to FIG. 8), a third CBR configuration indicating that the one or more parameters for the communication between the first UE and the second UE are to be based at least in part on measurements made during an active monitoring state of a DRX cycle (e.g., as described with respect to FIG. 9), and a fourth CBR configuration indicating that the one or more parameters for the communication between the first UE and the second UE are to be based at least in part on measurements measured during a period of time prior to the active monitoring state of the DRX cycle (e.g., as described with respect to FIGS. 7 and 10). While various examples are described herein, any of the described CBR configurations may be used for any of the different ranges associated with different communication frequencies.

In some aspects, the first UE may dynamically update the value for the DRX parameter based at least in part on an updated indication of communication frequency. For example, the first UE may determine that communications with a second UE are transitioning from low frequency to high frequency, or from high frequency to low frequency, and determine to update the offset parameter for transmissions to the second UE based on the transition.

In some aspects, the first UE may transmit, and the second UE may receive, the DRX configuration information. The DRX configuration information may indicate a value for a DRX parameter (e.g., an offset parameter, a duration time parameter, and/or a long cycle parameter, among other examples) and may indicate a CBR configuration for the first UE. The second UE may configure DRX using the DRX configuration information. For example, the second UE (e.g., Rx UE) may configure DRX with an offset parameter that causes the second UE to activate the active DRX state within a corresponding range of the DRX cycle. In some aspects, the second UE may transmit, to the first UE and based at least in part on the CBR configuration, at least one CBR metric. For example, the second UE (e.g., Rx UE) may measure CBR using resources specified by the CBR configuration and transmit the CBR to the first UE, which the first UE may use to determine one or more parameters (e.g., transmit parameters) for subsequent communications with the second RE.

In some aspects, Rx UEs with a relatively low probability (e.g., less than 0.1) of using an active DRX state to transmit or receive communications with a Tx UE may be considered to have low communication frequency, while Rx UEs with a relative high probability (e.g., greater than 0.9) of using the active DRX state to transmit or receive communications with the Tx UE may be considered to have high communication frequency.

As indicated above, FIG. 11 is provided as an example. Other examples may differ from what is described with respect to FIG. 11.

Figure 12:
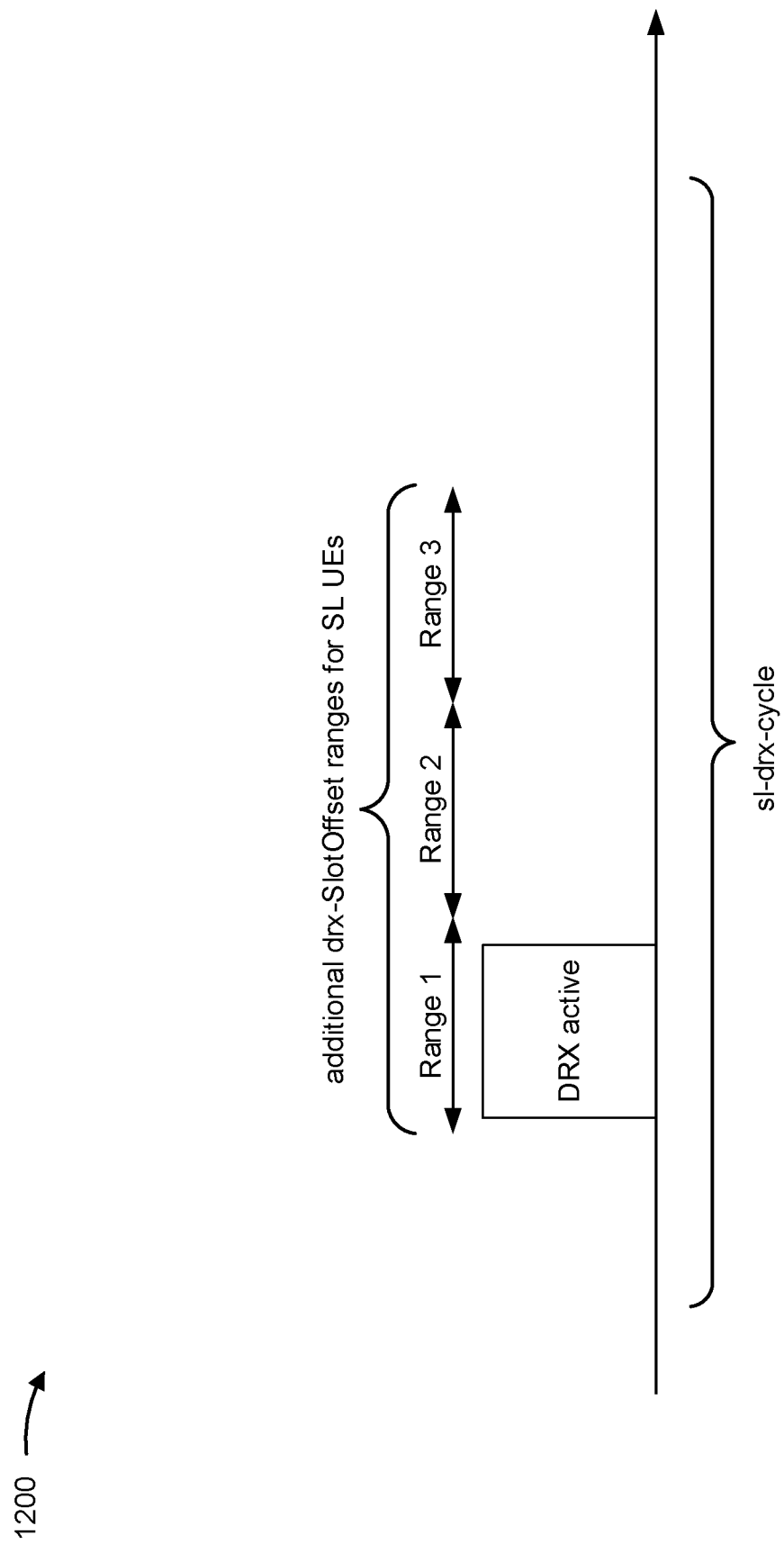

FIG. 12 is a diagram illustrating an example process 1200 associated with determining sidelink communication parameters for DRX communications, in accordance with the present disclosure. As shown in FIG. 12, a UE (e.g., UE 120) may selectively determine a manner in which to measure CBR during DRX.

In some aspects, the indication of communication frequency is associated with multiple ranges of communication frequency (e.g., more than two ranges). For example, as shown in example 1200, three additional ranges are shown as being included in a portion of the DRX cycle. The additional ranges may be used alternatively to, or in addition to, the two ranges described with respect to example 1100 of FIG. 11. The multiple ranges of communication frequency (e.g., range 1, range 2, and range 3) may be associated with respective values for the DRX parameter, and the UE may determine the value for the DRX parameter based on a respective value associated with the range of communication frequency associated with the UE. For example, range 1, range 2, and range 3 may be associated with the same or different DRX parameters, and the DRX parameter (e.g., offset parameter) to be used may depend on the range within which the UE communication frequency places the UE. In example 1200, the active DRX state is in range 1, so the UE may use the DRX parameter associated with range 1.

The CBR configuration for a communication between a first UE (e.g., Tx UE) and a second UE (e.g., Rx UE) may indicate different types of CBR configuration for different ranges of communication frequency, as described above with respect to FIG. 11. For example, one type of CBR configuration (e.g., associated with range 1) may indicate that the second UE is to forego measuring at least one CBR metric during the active DRX state, while a second type of CBR configuration (e.g., associated with range 2 and/or range 1) may indicate that the second UE is to measure the at least one CBR metric during the active DRX state, during a time period before the active DRX state, and/or in response to receiving a sidelink WUS from the first UE, among other examples described herein.

As indicated above, FIG. 12 is provided as an example. Other examples may differ from what is described with respect to FIG. 12.

Figure 13:
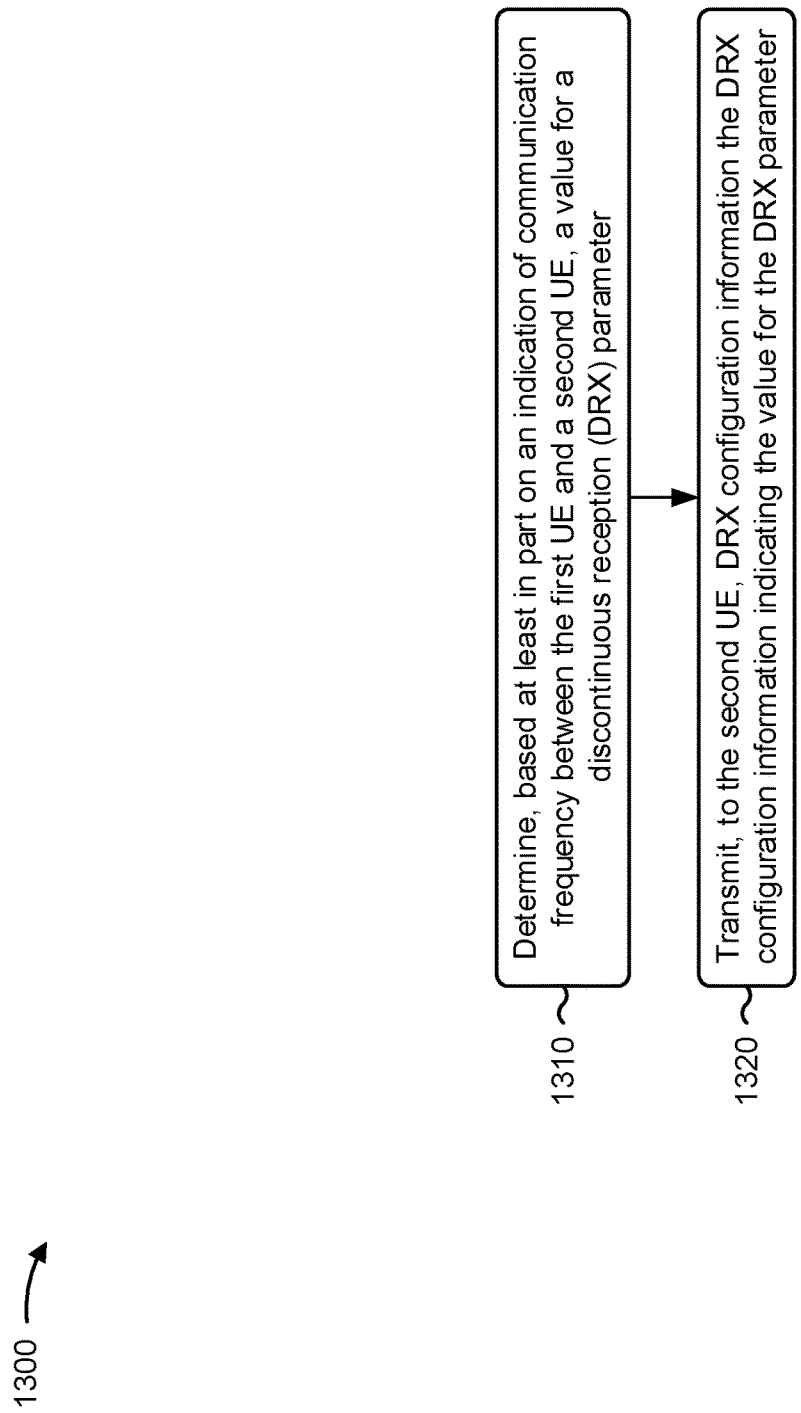
FIGS. 13 and 14 are diagrams illustrating example processes associated with determining sidelink communication parameters for DRX communications, in accordance with the present disclosure.

FIG. 13 is a diagram illustrating an example process 1300 performed, for example, by a first user equipment (UE), in accordance with the present disclosure. Example process 1300 is an example where the UE (e.g., UE 120) performs operations associated with determining discontinuous reception communication parameters for sidelink communications.

As shown in FIG. 13, in some aspects, process 1300 may include determining, based at least in part on an indication of communication frequency between the first UE and a second UE, a value for a discontinuous reception (DRX) parameter (block 1310). For example, the UE (e.g., using communication component 1508, depicted in FIG. 15) may determine, based at least in part on an indication of communication frequency between the first UE and a second UE, a value for a discontinuous reception (DRX) parameter, as described above.

As further shown in FIG. 13, in some aspects, process 1300 may include transmitting, to the second UE, DRX configuration information, the DRX configuration information indicating the value for the DRX parameter (block 1320). For example, the UE (e.g., using transmission component 1504, depicted in FIG. 15) may transmit, to the second UE, DRX configuration information, the DRX configuration information indicating the value for the DRX parameter, as described above.

Process 1300 may include additional aspects, such as any single aspect or any combination of aspects described below and/or in connection with one or more other processes described elsewhere herein.

In a first aspect, the DRX parameter comprises an offset parameter indicating a time gap between a beginning of a DRX cycle and an active monitoring state of the DRX cycle.

In a second aspect, alone or in combination with the first aspect, the indication of communication frequency comprises a probability that the first UE will transmit a communication to the second UE, or a CR measurement.

In a third aspect, alone or in combination with one or more of the first and second aspects, process 1300 includes determining that the indication of communication frequency is associated with a range of communication frequency of a plurality of ranges of communication frequency, the plurality of ranges of communication frequency being associated with respective values for the DRX parameter, and wherein determining the value for the DRX parameter comprises determining, as the value for the DRX parameter, a respective value associated with the range of communication frequency.

In a fourth aspect, alone or in combination with one or more of the first through third aspects, the range of communication frequency is higher than another range of communication frequency of the plurality of ranges of communication frequency, and wherein the respective value associated with the range of communication frequency is higher than another respective value associated with the other range of communication frequency.

In a fifth aspect, alone or in combination with one or more of the first through fourth aspects, a CBR configuration for a communication between the first UE and the second UE indicates different types of CBR configuration for different ranges of communication frequency.

In a sixth aspect, alone or in combination with one or more of the first through fifth aspects, a first type of CBR configuration, of the different types of CBR configuration, indicates that the first UE is to measure at least one CBR metric during an active monitoring state of a DRX cycle, and wherein a second type of CBR configuration, of the different types of CBR configuration, indicates that the first UE is to forego measuring the at least one CBR metric during the active monitoring state of the DRX cycle.

In a seventh aspect, alone or in combination with one or more of the first through sixth aspects, a first type of CBR configuration, of the different types of CBR configuration, indicates that the second UE is to measure at least one CBR metric during an active monitoring state of a DRX cycle, and wherein a second type of CBR configuration, of the different types of CBR configuration, indicates that the second UE is to forego measuring the at least one CBR metric during the active monitoring state of the DRX cycle.

In an eighth aspect, alone or in combination with one or more of the first through seventh aspects, the DRX configuration information includes data identifying one of a plurality of different types of CBR configurations.

In a ninth aspect, alone or in combination with one or more of the first through eighth aspects, the plurality of different types of CBR configurations include a plurality of a first CBR configuration indicating that one or more parameters for a communication between the first UE and the second UE are predetermined and independent of a CBR metric associated with a set of resources used to transmit the communication, a second CBR configuration indicating that the one or more parameters for the communication between the first UE and the second UE are to be based at least in part on measurements measured based at least in part on the first UE transmitting a sidelink WUS to the second UE, a third CBR configuration indicating that the one or more parameters for the communication between the first UE and the second UE are to be based at least in part on measurements made during an active monitoring state of a DRX cycle, and a fourth CBR configuration indicating that the one or more parameters for the communication between the first UE and the second UE are to be based at least in part on measurements measured during a period of time prior to the active monitoring state of the DRX cycle.

In a tenth aspect, alone or in combination with one or more of the first through ninth aspects, the first UE dynamically updates the value for the DRX parameter based at least in part on an updated indication of communication frequency.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
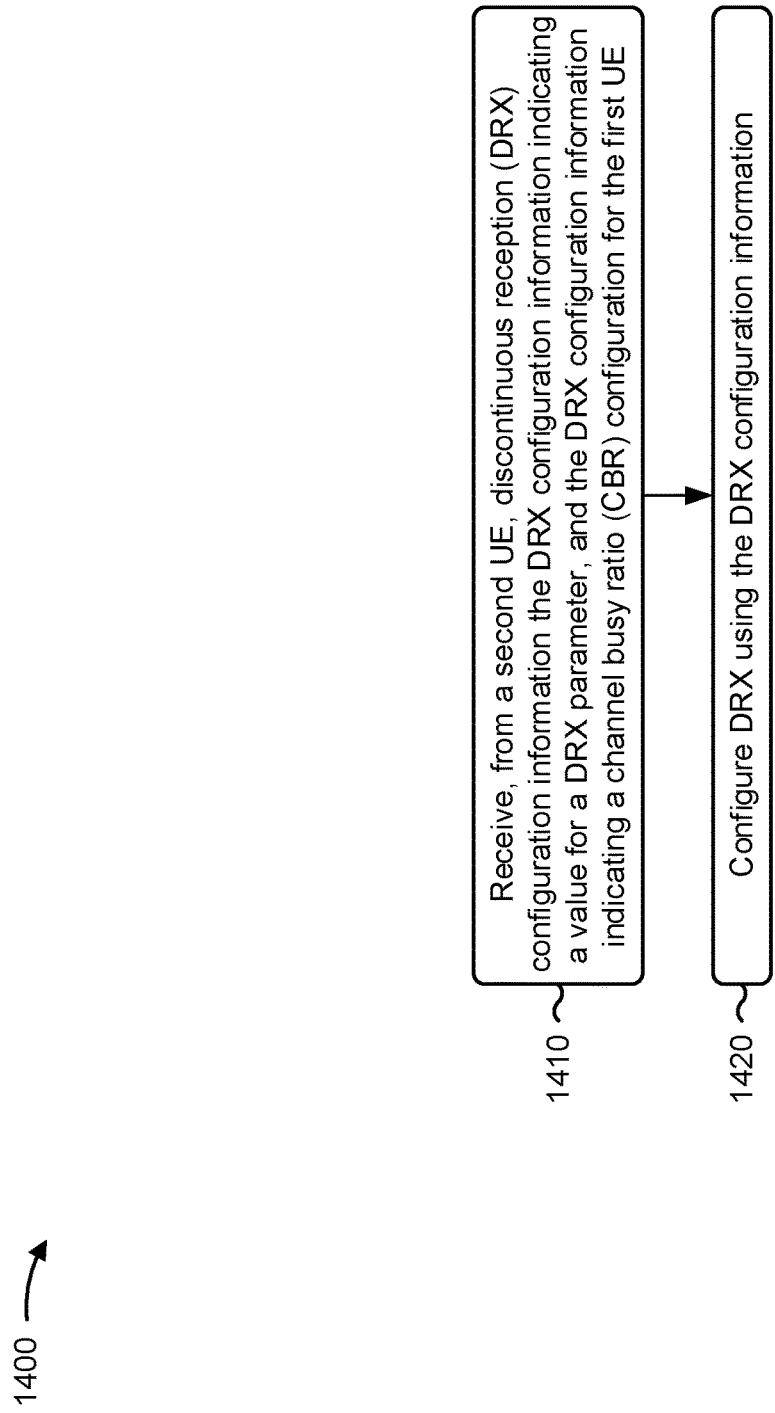

FIG. 14 is a diagram illustrating an example process 1400 performed, for example, by a UE, in accordance with the present disclosure. Example process 1400 is an example where the UE (e.g., UE 120) performs operations associated with determining discontinuous reception communication parameters for sidelink communications.

As shown in FIG. 14, in some aspects, process 1400 may include receiving, from a second UE, discontinuous reception (DRX) configuration information, the DRX configuration information indicating a value for a DRX parameter, and the DRX configuration information indicating a channel busy ratio (CBR) configuration for the first UE (block 1410). For example, the UE (e.g., using reception component 1502, depicted in FIG. 15) may receive, from a second UE, discontinuous reception (DRX) configuration information, the DRX configuration information indicating a value for a DRX parameter, and the DRX configuration information indicating a channel busy ratio (CBR) configuration for the first UE, as described above.

As further shown in FIG. 14, in some aspects, process 1400 may include configuring DRX using the DRX configuration information (block 1420). For example, the UE (e.g., using configuration component 1510, depicted in FIG. 15) may configure DRX using the DRX configuration information, as described above.

Process 1400 may include additional aspects, such as any single aspect or any combination of aspects described below and/or in connection with one or more other processes described elsewhere herein.

In a first aspect, the DRX parameter comprises an offset parameter indicating a time gap between a beginning of a DRX cycle and an active monitoring state of the DRX cycle.

In a second aspect, alone or in combination with the first aspect, the CBR configuration is one of a plurality of different types of CBR configuration.

In a third aspect, alone or in combination with one or more of the first and second aspects, a first type of CBR configuration, of the different types of CBR configuration, indicates that the first UE is to measure at least one CBR metric during an active monitoring state of a DRX cycle, and wherein a second type of CBR configuration, of the different types of CBR configuration, indicates that the first UE is to forego measuring the at least one CBR metric during the active monitoring state of the DRX cycle.

In a fourth aspect, alone or in combination with one or more of the first through third aspects, the plurality of different types of CBR configuration include a plurality of a first CBR configuration indicating that one or more parameters for a communication between the first UE and the second UE are predetermined and independent of a CBR metric associated with a set of resources used to transmit the communication, a second CBR configuration indicating that the one or more parameters for the communication between the first UE and the second UE are to be based at least in part on measurements measured based at least in part on the first UE receiving a sidelink WUS from the second UE, a third CBR configuration indicating that the one or more parameters for the communication between the first UE and the second UE are to be based at least in part on measurements made during an active monitoring state of a DRX cycle, and a fourth CBR configuration indicating that the one or more parameters for the communication between the first UE and the second UE are to be based at least in part on measurements measured during a period of time prior to the active monitoring state of the DRX cycle.

In a fifth aspect, alone or in combination with one or more of the first through fourth aspects, process 1400 includes transmitting, to the second UE and based at least in part on the CBR configuration, at least one CBR metric.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
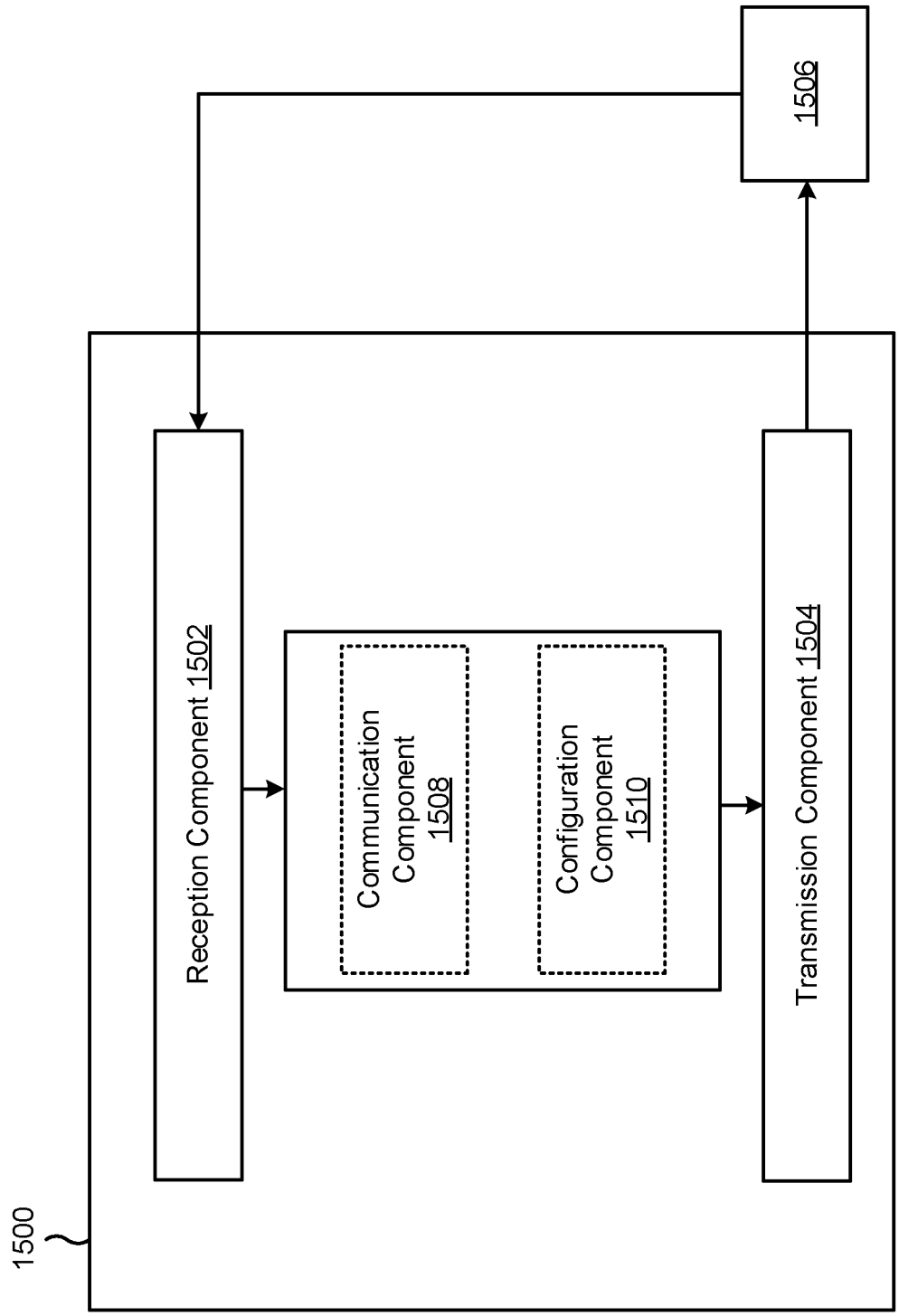
FIG. 15 is a block diagram of an example apparatus for wireless communication, in accordance with the present disclosure.

FIG. 15 is a block diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include one or more of a communication component 1508, or a configuration component 1510, among other examples.

In some aspects, the apparatus 1500 may be configured to perform one or more operations described herein in connection with FIGS. 6-12. Additionally, or alternatively, the apparatus 1500 may be configured to perform one or more processes described herein, such as process 1300 of FIG. 13, process 1400 of FIG. 14, or a combination thereof. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

The communication component 1508 may determine, based at least in part on an indication of communication frequency between the first UE and a second UE, a value for a discontinuous reception (DRX) parameter. The transmission component 1504 may transmit, to the second UE, DRX configuration information the DRX configuration information indicating the value for the DRX parameter.

The communication component 1508 may determine that the indication of communication frequency is associated with a range of communication frequency of a plurality of ranges of communication frequency the plurality of ranges of communication frequency being associated with respective values for the DRX parameter.

The reception component 1502 may receive, from a second UE, discontinuous reception (DRX) configuration information the DRX configuration information indicating a value for a DRX parameter, and the DRX configuration information indicating a channel busy ratio (CBR) configuration for the first UE. The configuration component 1510 may configure DRX using the DRX configuration information.

The transmission component 1504 may transmit, to the second UE and based at least in part on the CBR configuration, at least one CBR metric.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a first user equipment (UE), comprising: determining, based at least in part on an indication of communication frequency between the first UE and a second UE, a value for a discontinuous reception (DRX) parameter; and transmitting, to the second UE, DRX configuration information, the DRX configuration information indicating the value for the DRX parameter.

Aspect 2: The method of Aspect 1, wherein the DRX parameter comprises an offset parameter indicating a time gap between a beginning of a DRX cycle and an active monitoring state of the DRX cycle.

Aspect 3: The method of any of Aspects 1 or 2, wherein the indication of communication frequency comprises: a probability that the first UE will transmit a communication to the second UE, or a channel occupancy ratio (CR) measurement.

Aspect 4: The method of any of Aspects 1-3, further comprising: determining that the indication of communication frequency is associated with a range of communication frequency of a plurality of ranges of communication frequency, the plurality of ranges of communication frequency being associated with respective values for the DRX parameter; and wherein determining the value for the DRX parameter comprises: determining, as the value for the DRX parameter, a respective value associated with the range of communication frequency. wherein determining the value for the DRX parameter comprises: determining, as the value for the DRX parameter, a respective value associated with the range of communication frequency.

Aspect 5: The method of Aspect 4, wherein the range of communication frequency is higher than another range of communication frequency of the plurality of ranges of communication frequency, and wherein the respective value associated with the range of communication frequency is higher than another respective value associated with the other range of communication frequency.

Aspect 6: The method of Aspect 4, wherein a channel busy ratio (CBR) configuration for a communication between the first UE and the second UE indicates different types of CBR configuration for different ranges of communication frequency.

Aspect 7: The method of Aspect 6, wherein a first type of CBR configuration, of the different types of CBR configuration, indicates that the first UE is to measure at least one CBR metric during an active monitoring state of a DRX cycle, and wherein a second type of CBR configuration, of the different types of CBR configuration, indicates that the first UE is to forego measuring the at least one CBR metric during the active monitoring state of the DRX cycle.

Aspect 8: The method of Aspect 6, wherein a first type of CBR configuration, of the different types of CBR configuration, indicates that the second UE is to measure at least one CBR metric during an active monitoring state of a DRX cycle, and wherein a second type of CBR configuration, of the different types of CBR configuration, indicates that the second UE is to forego measuring the at least one CBR metric during the active monitoring state of the DRX cycle.

Aspect 9: The method of any of Aspects 1-8, wherein the DRX configuration information includes data identifying one of a plurality of different types of channel busy ratio (CBR) configurations.

Aspect 10: The method of Aspect 9, wherein the plurality of different types of CBR configurations include a plurality of: a first CBR configuration indicating that one or more parameters for a communication between the first UE and the second UE are predetermined and independent of a CBR metric associated with a set of resources used to transmit the communication, a second CBR configuration indicating that the one or more parameters for the communication between the first UE and the second UE are to be based at least in part on measurements measured based at least in part on the first UE transmitting a sidelink wake-up signal (WUS) to the second UE, a third CBR configuration indicating that the one or more parameters for the communication between the first UE and the second UE are to be based at least in part on measurements made during an active monitoring state of a DRX cycle, and a fourth CBR configuration indicating that the one or more parameters for the communication between the first UE and the second UE are to be based at least in part on measurements measured during a period of time prior to the active monitoring state of the DRX cycle.

Aspect 11: The method of any of Aspects 1-10, wherein the first UE dynamically updates the value for the DRX parameter based at least in part on an updated indication of communication frequency.

Aspect 12: A method of wireless communication performed by a first user equipment (UE), comprising: receiving, from a second UE, discontinuous reception (DRX) configuration information, the DRX configuration information indicating a value for a DRX parameter, and the DRX configuration information indicating a channel busy ratio (CBR) configuration for the first UE; and configuring DRX using the DRX configuration information.

Aspect 13: The method of Aspect 12, wherein the DRX parameter comprises an offset parameter indicating a time gap between a beginning of a DRX cycle and an active monitoring state of the DRX cycle.

Aspect 14: The method of any of Aspects 12 or 13, wherein the CBR configuration is one of a plurality of different types of CBR configuration.

Aspect 15: The method of Aspect 14, wherein a first type of CBR configuration, of the different types of CBR configuration, indicates that the first UE is to measure at least one CBR metric during an active monitoring state of a DRX cycle, and wherein a second type of CBR configuration, of the different types of CBR configuration, indicates that the first UE is to forego measuring the at least one CBR metric during the active monitoring state of the DRX cycle.

Aspect 16: The method of Aspect 14, wherein the plurality of different types of CBR configuration include a plurality of: a first CBR configuration indicating that one or more parameters for a communication between the first UE and the second UE are predetermined and independent of a CBR metric associated with a set of resources used to transmit the communication, a second CBR configuration indicating that the one or more parameters for the communication between the first UE and the second UE are to be based at least in part on measurements measured based at least in part on the first UE receiving a sidelink wake-up signal (WUS) from the second UE, a third CBR configuration indicating that the one or more parameters for the communication between the first UE and the second UE are to be based at least in part on measurements made during an active monitoring state of a DRX cycle, and a fourth CBR configuration indicating that the one or more parameters for the communication between the first UE and the second UE are to be based at least in part on measurements measured during a period of time prior to the active monitoring state of the DRX cycle.

Aspect 17: The method of any of Aspects 12-16, further comprising: transmitting, to the second UE and based at least in part on the CBR configuration, at least one CBR metric.

Aspect 18: An apparatus for wireless communication at a device, comprising a processor; memory coupled with the processor; and instructions stored in the memory and executable by the processor to cause the apparatus to perform the method of one or more Aspects of Aspects 1-11.

Aspect 19: An apparatus for wireless communication at a device, comprising a processor; memory coupled with the processor; and instructions stored in the memory and executable by the processor to cause the apparatus to perform the method of one or more Aspects of Aspects 12-17.

Aspect 20: A device for wireless communication, comprising a memory and one or more processors coupled to the memory, the memory and the one or more processors configured to perform the method of one or more Aspects of Aspects 1-11.

Aspect 21: A device for wireless communication, comprising a memory and one or more processors coupled to the memory, the memory and the one or more processors configured to perform the method of one or more Aspects of Aspects 12-17.

Aspect 22: An apparatus for wireless communication, comprising at least one means for performing the method of one or more Aspects of Aspects 1-11.

Aspect 23: An apparatus for wireless communication, comprising at least one means for performing the method of one or more Aspects of Aspects 12-17.

Aspect 24: A non-transitory computer-readable medium storing code for wireless communication, the code comprising instructions executable by a processor to perform the method of one or more Aspects of Aspects 1-11.

Aspect 25: A non-transitory computer-readable medium storing code for wireless communication, the code comprising instructions executable by a processor to perform the method of one or more Aspects of Aspects 12-17.

Aspect 26: A non-transitory computer-readable medium storing a set of instructions for wireless communication, the set of instructions comprising one or more instructions that, when executed by one or more processors of a device, cause the device to perform the method of one or more Aspects of Aspects 1-11.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 12-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A first user equipment (UE) for wireless communication, comprising:
a memory; and
one or more processors, coupled to the memory, configured to:

determine, based at least in part on an indication of communication frequency between the first UE and a second UE, a value for a discontinuous reception (DRX) parameter; and transmit, to the second UE, DRX configuration information, the DRX configuration information indicating: (i) the value for the DRX parameter and (ii) a channel busy ratio (CBR) configuration indicating when CBR measurement is performed during DRX.

2. The first UE of claim 1, wherein the DRX parameter comprises an offset parameter indicating a time gap between a beginning of a DRX cycle and an active monitoring state of the DRX cycle.

3. The first UE of claim 1, wherein the indication of communication frequency comprises:
a probability that the first UE will transmit a communication to the second UE, or
a channel occupancy ratio (CR) measurement.

4. The first UE of claim 1, wherein the one or more processors are further configured to:
determine that the indication of communication frequency is associated with a range of communication frequency of a plurality of ranges of communication frequency, the plurality of ranges of communication frequency being associated with respective values for the DRX parameter; and
wherein the one or more processors, to determine the value for the DRX parameter, are configured to:
determine, as the value for the DRX parameter, a respective value associated with the range of communication frequency.

5. The first UE of claim 4, wherein the range of communication frequency is higher than another range of communication frequency of the plurality of ranges of communication frequency, and
wherein the respective value associated with the range of communication frequency is higher than another respective value associated with the other range of communication frequency.

6. The first UE of claim 4, wherein the CBR configuration for a communication between the first UE and the second UE indicates different types of CBR configuration for different ranges of communication frequency.

7. The first UE of claim 6, wherein a first type of CBR configuration, of the different types of CBR configuration, indicates that the first UE is to measure at least one CBR metric during an active monitoring state of a DRX cycle, and
wherein a second type of CBR configuration, of the different types of CBR configuration, indicates that the first UE is to forego measuring the at least one CBR metric during the active monitoring state of the DRX cycle.

8. The first UE of claim 6, wherein a first type of CBR configuration, of the different types of CBR configuration, indicates that the second UE is to measure at least one CBR metric during an active monitoring state of a DRX cycle, and
wherein a second type of CBR configuration, of the different types of CBR configuration, indicates that the second UE is to forego measuring the at least one CBR metric during the active monitoring state of the DRX cycle.

9. The first UE of claim 1, wherein the DRX configuration information includes data identifying one of a plurality of different types of CBR configurations.

10. The first UE of claim 9, wherein the plurality of different types of CBR configurations include a plurality of:

a first CBR configuration indicating that one or more parameters for a communication between the first UE and the second UE are predetermined and independent of a CBR metric associated with a set of resources used to transmit the communication,
a second CBR configuration indicating that the one or more parameters for the communication between the first UE and the second UE are to be based at least in part on measurements measured based at least in part on the first UE transmitting a sidelink wake-up signal (WUS) to the second UE,
a third CBR configuration indicating that the one or more parameters for the communication between the first UE and the second UE are to be based at least in part on measurements made during an active monitoring state of a DRX cycle, and
a fourth CBR configuration indicating that the one or more parameters for the communication between the first UE and the second UE are to be based at least in part on measurements measured during a period of time prior to the active monitoring state of the DRX cycle.

11. The first UE of claim 1, wherein the first UE dynamically updates the value for the DRX parameter based at least in part on an updated indication of communication frequency.

12. A first user equipment (UE) for wireless communication, comprising:
a memory; and
one or more processors, coupled to the memory, configured to:
receive, from a second UE, discontinuous reception (DRX) configuration information,
the DRX configuration information indicating a value for a DRX parameter, and
the DRX configuration information indicating a channel busy ratio (CBR) configuration for the first UE, the CBR configuration indicating when CBR measurement is performed during DRX; and
configure DRX using the DRX configuration information.

13. The first UE of claim 12, wherein the DRX parameter comprises an offset parameter indicating a time gap between a beginning of a DRX cycle and an active monitoring state of the DRX cycle.

14. The first UE of claim 12, wherein the CBR configuration is one of a plurality of different types of CBR configuration.

15. The first UE of claim 14, wherein a first type of CBR configuration, of the different types of CBR configuration, indicates that the first UE is to measure at least one CBR metric during an active monitoring state of a DRX cycle, and
wherein a second type of CBR configuration, of the different types of CBR configuration, indicates that the first UE is to forego measuring the at least one CBR metric during the active monitoring state of the DRX cycle.

16. The first UE of claim 14, wherein the plurality of different types of CBR configuration include a plurality of:
a first CBR configuration indicating that one or more parameters for a communication between the first UE and the second UE are predetermined and independent of a CBR metric associated with a set of resources used to transmit the communication,
a second CBR configuration indicating that the one or more parameters for the communication between the first UE and the second UE are to be based at least in part on measurements measured based at least in part on the first UE receiving a sidelink wake-up signal (WUS) from the second UE,
a third CBR configuration indicating that the one or more parameters for the communication between the first UE and the second UE are to be based at least in part on measurements made during an active monitoring state of a DRX cycle, and
a fourth CBR configuration indicating that the one or more parameters for the communication between the first UE and the second UE are to be based at least in part on measurements measured during a period of time prior to the active monitoring state of the DRX cycle.

17. The first UE of claim 12, wherein the one or more processors are further configured to:
transmit, to the second UE and based at least in part on the CBR configuration, at least one CBR metric.

18. A method of wireless communication performed by a first user equipment (UE), comprising:
determining, based at least in part on an indication of communication frequency between the first UE and a second UE, a value for a discontinuous reception (DRX) parameter; and
transmitting, to the second UE, DRX configuration information, the DRX configuration information indicating: (i) the value for the DRX parameter and (ii) a channel busy ratio (CBR) configuration indicating when CBR measurement is performed during DRX.

19. The method of claim 18, wherein the DRX parameter comprises an offset parameter indicating a time gap between a beginning of a DRX cycle and an active monitoring state of the DRX cycle.

20. The method of claim 18, wherein the indication of communication frequency comprises:
a probability that the first UE will transmit a communication to the second UE, or
a channel occupancy ratio (CR) measurement.

21. The method of claim 18, further comprising:
determining that the indication of communication frequency is associated with a range of communication frequency of a plurality of ranges of communication frequency,
the plurality of ranges of communication frequency being associated with respective values for the DRX parameter; and
wherein determining the value for the DRX parameter comprises:
determining, as the value for the DRX parameter, a respective value associated with the range of communication frequency.

22. The method of claim 21, wherein the range of communication frequency is higher than another range of communication frequency of the plurality of ranges of communication frequency, and
wherein the respective value associated with the range of communication frequency is higher than another respective value associated with the other range of communication frequency.

23. The method of claim 21, wherein the CBR configuration for a communication between the first UE and the second UE indicates different types of CBR configuration for different ranges of communication frequency.

24. The method of claim 18, wherein the DRX configuration information includes data identifying one of a plurality of different types of CBR configurations.

25. The method of claim 24, wherein the plurality of different types of CBR configurations include a plurality of:

a first CBR configuration indicating that one or more parameters for a communication between the first UE and the second UE are predetermined and independent of a CBR metric associated with a set of resources used to transmit the communication,
a second CBR configuration indicating that the one or more parameters for the communication between the first UE and the second UE are to be based at least in part on measurements measured based at least in part on the first UE transmitting a sidelink wake-up signal (WUS) to the second UE,
a third CBR configuration indicating that the one or more parameters for the communication between the first UE and the second UE are to be based at least in part on measurements made during an active monitoring state of a DRX cycle, and
a fourth CBR configuration indicating that the one or more parameters for the communication between the first UE and the second UE are to be based at least in part on measurements measured during a period of time prior to the active monitoring state of the DRX cycle.

26. The method of claim 18, further comprising:
dynamically updating the value for the DRX parameter based at least in part on an updated indication of communication frequency.

27. A method of wireless communication performed by a first user equipment (UE), comprising:
receiving, from a second UE, discontinuous reception (DRX) configuration information,
the DRX configuration information indicating a value for a DRX parameter, and
the DRX configuration information indicating a channel busy ratio (CBR) configuration for the first UE, the CBR configuration indicating when CBR measurement is performed during DRX; and
configuring DRX using the DRX configuration information.

28. The method of claim 27, wherein the DRX parameter comprises an offset parameter indicating a time gap between a beginning of a DRX cycle and an active monitoring state of the DRX cycle.

29. The method of claim 27, wherein the CBR configuration is one of a plurality of different types of CBR configuration,
wherein a first type of CBR configuration, of the different types of CBR configuration, indicates that the first UE is to measure at least one CBR metric during an active monitoring state of a DRX cycle, and
wherein a second type of CBR configuration, of the different types of CBR configuration, indicates that the first UE is to forego measuring the at least one CBR metric during the active monitoring state of the DRX cycle.

30. The method of claim 27, wherein the CBR configuration is one of a plurality of different types of CBR configuration, and
wherein the plurality of different types of CBR configuration include a plurality of:
a first CBR configuration indicating that one or more parameters for a communication between the first UE and the second UE are predetermined and independent of a CBR metric associated with a set of resources used to transmit the communication,
a second CBR configuration indicating that the one or more parameters for the communication between the first UE and the second UE are to be based at least in part on measurements measured based at least in part on the first UE receiving a sidelink wake-up signal (WUS) from the second UE,
a third CBR configuration indicating that the one or more parameters for the communication between the first UE and the second UE are to be based at least in part on measurements made during an active monitoring state of a DRX cycle, and
a fourth CBR configuration indicating that the one or more parameters for the communication between the first UE and the second UE are to be based at least in part on measurements measured during a period of time prior to the active monitoring state of the DRX cycle.

\* \* \* \* \*